United States Patent [19]
Suda et al.

[11] Patent Number: 5,958,827
[45] Date of Patent: Sep. 28, 1999

[54] SOLID SOLUTION PARTICLE OF OXIDES, A PROCESS FOR PRODUCING THE SAME AND A CATALYST FOR PURIFYING EXHAUST GASES

[75] Inventors: Akihiko Suda, Seto; Hideo Sobukawa, Nissin; Tadashi Suzuki, Seto; Toshio Kandori, Seto; Yoshio Ukyo, Seto; Masahiro Sugiura, Aichi-ken; Mareo Kimura, Nagoya; Hiroshi Hirayama, Okazaki; Yasuo Ikeda, Toyota, all of Japan

[73] Assignees: Toyota Jidosha Kabushiki Kaisha; Kabushiki Kaisha Toyota Chuo Kenkyusho, both of Aichi, Japan

[21] Appl. No.: 08/758,807

[22] Filed: Dec. 4, 1996

[30] Foreign Application Priority Data

| Dec. 7, 1995 | [JP] | Japan | 7-319412 |
| Dec. 7, 1995 | [JP] | Japan | 7-319413 |
| Nov. 26, 1996 | [JP] | Japan | 8-314840 |

[51] Int. Cl.$^6$ .................................................. B01J 23/10
[52] U.S. Cl. ......................... 502/304; 502/300; 502/306; 502/349
[58] Field of Search .................................. 502/300, 304, 502/306, 349

[56] References Cited

U.S. PATENT DOCUMENTS

| 5,532,198 | 7/1996 | Chopin et al. | 502/304 |
| 5,693,299 | 12/1997 | Chopin et al. | 423/213.2 |
| 5,712,218 | 1/1998 | Chopin et al. | 502/304 |
| 5,723,101 | 3/1998 | Cuif | 423/592 |
| 5,747,401 | 5/1998 | Cuif | 501/103 |

FOREIGN PATENT DOCUMENTS

| A-0 272 136 | 6/1988 | European Pat. Off. . |
| A-0 337 809 | 10/1989 | European Pat. Off. . |
| A-0 507 590 | 10/1992 | European Pat. Off. . |
| A-0 611 192 | 8/1994 | European Pat. Off. . |
| A-0 715 879 | 6/1996 | European Pat. Off. . |
| 3-131343 | 6/1991 | Japan . |
| 4-55315 | 2/1992 | Japan . |
| 4-284847 | 10/1992 | Japan . |

OTHER PUBLICATIONS

P. Fornasiero, R. DiMonte, G. Ranga Rao, J. Kaspar, S. Meriani, A. Trovarelli, & M. Graziani, Rh–Loaded CeO2–ZrO2 Solid Solutions as Highly Efficient Oxygen Exchangers: Dependence of the Reduction of Behavior and the Oxygen Storage Capacity on the Structural Properties, "Journal of Catalysis" (1995), pp. 168–177, No Month.

*Primary Examiner*—Michael Lewis
*Assistant Examiner*—Alexander G. Ghyka
*Attorney, Agent, or Firm*—Oliff & Berridge, PLC

[57] ABSTRACT

A solid solution particle of oxides contains a solid solution of oxides in which one oxide is dissolved into the other oxide, and in which the degree of dissolution of one oxide into the other oxide is not less 50%, and in which an average diameter of crystallite is not more than 100 nm. The solid solution particle of oxides has small average diameter of a crystallite and large specific surface area, and it improves capacities such as an oxygen storage ability due to high degree of dissolution. A catalyst for purifying exhaust gases has excellent purifying performance by employing the solid solution comprising ceria and zirconia which has large OSC and high oxygen adsorption and discharge speed.

28 Claims, 13 Drawing Sheets

Sample (1) 93 % ($CeO_2$ + $ZrO_2$) + 7 % $Y(NO_3)_3$
(2) 93 % ($CeO_2$ + $ZrO_2$) + 7 % $La(NO_3)_3$
(3) 90 % ($CeO_2$ + $ZrO_2$) + 10 % $Mg(NO_3)_3$
(4) 95 % ($CeO_2$ + $ZrO_2$) + 5 % $Ca(NO_3)_3$
(5) 90 % ($CeO_2$ + $ZrO_2$) + 10 % $Sr(NO_3)_3$
(6) 90 % ($CeO_2$ + $ZrO_2$) + 10 % $Ba(NO_3)_3$
(7) 100 % ($CeO_2$ + $ZrO_2$)

Provided that $CeO_2/ZrO_2$ = 50/50 %

SOLID SOLUTION PARTICLE OF OXIDES, A PROCESS FOR PRODUCING THE SAME AND A CATALYST FOR PURIFYING EXHAUST GASES

BACKGROUND OF THE INVENTION

1. Field of the Invention

This invention relates to a solid solution particle of oxides, a process for producing the same and a catalyst for purifying exhaust gases by utilizing the solid solution particle of oxide. A solid solution of oxides of the present invention contains, for example, a solid solution of cerium oxide (called ceria hereafter) and zirconium oxide (called zirconia hereafter). In this case, an oxygen adsorption and discharge ability (an oxygen storage ability) of ceria is further improved so that the solid solution of oxides is useful as a support of a catalyst for purifying exhaust gases. Furthermore, the solid solution of oxides of the present invention can be employed as a catalyst for oxidizing a diesel particulate, a solid electrolyte, an electrode material, a reinforced particle by being dispersed in ceramics, a material for shielding ultraviolet and the like.

A catalyst for purifying exhaust gases of the present invention is excellent in its purifying activity in order to efficiently purify harmful components such as carbon monoxide, hydrocarbon, nitrogen oxide and the like contained in exhaust gases in automobiles. Even after the catalyst is subjected to high temperature, purifying performance is not remarkably degraded, and the catalyst is excellent in its durability.

2. Description of Related Arts

Ceria has been widely employed as a promotor of a catalyst for purifying exhaust gases exhausted from an internal combustion engine because it has an oxygen storage ability.

For example, a three-way catalyst oxidizes carbon monoxide and hydrocarbon contained in exhaust gases as well as it reduces nitrogen oxide. The three-way catalyst is employed in such a condition that an air/fuel (A/F) ratio is controlled to be a theoretical air/fuel ratio. However, the air/fuel ratio is deviated from the theoretical air/fuel ratio at the period of transition. In this case, if a catalyst on which ceria is loaded is employed, the air/fuel ratio can be controlled to be nearly the theoretical air/fuel ratio due to an oxygen adsorption and discharge action of ceria. As a result, the width (window) of the air/fuel ratio is widened, and purifying performance of the catalyst can be improved. Furthermore, an oxygen partial pressure is adjusted to be almost constant so that the catalyst has an effect to prevent sintering of a noble metal as a catalyst component.

In order to improve the oxygen storage ability, ceria is employed in powdery condition because a specific surface area is preferably large.

However, it is necessary that the catalyst is employed in high temperature, and that purifying activity is high after the catalyst is subjected to high temperature. So, even if ceria is employed in such a manner that it has large specific surface area as a powder, it is necessary that the large specific surface area is not damaged when ceria is employed at high temperature. Namely, ceria is required to have high heat resistance.

As a result, it has been conventionally proposed that zirconia or oxides of rare-earth elements except cerium are dissolved into ceria.

For example, Japanese Unexamined Patent Publication No. 55315/1992 discloses a process for producing a powdered body of cerium oxide in which ceria and zirconia are coprecipitated in a mixed aqueous solution comprising water soluble salt of cerium and water soluble salt of zirconium, and then, the obtained coprecipitate is subjected to heat treatment. In this process, due to such heat treatment on the coprecipitate, cerium and zirconium are changed to be oxides, and a solid solution of oxides in which zirconium is dissolved into cerium is produced.

Furthermore, Japanese Unexamined Patent Publication No. 284847/1992 discloses a process for producing a powder in which zirconia or an oxide of at least one of rare-earth elements and ceria are dissolved due to an impregnation method or a coprecipitation method.

Moreover, Japanese Unexamined Patent Publication No. 131343/1991 discloses a process for producing a catalyst for purifying exhaust gases in which a mixed oxide of ceria and zirconia is produced by utilizing a precipitated formation reaction in an aqueous solution, and then, a slurry containing this oxide is coated on a monolithic support. This catalyst for purifying exhaust gases has excellent oxygen storage ability as compared with a catalyst in which only ceria is employed or a mixed powder of ceria and zirconia is employed because zirconia is dissolved into ceria. Further, the catalyst has excellent heat resistance because of a stabilization action of zirconia.

However, even the catalyst for purifying exhaust gases produced by the process disclosed in Japanese Unexamined Patent Publication No. 131343/1991 has not still satisfied severe restrictions on exhaust gases in recent years. Furthermore, according to the research of present inventors, it is found out that the solid solution of oxides produced by the process disclosed in the above-mentioned Japanese Unexamined Patent Publication has excellent heat resistance, but the oxygen storage ability is not satisfactory.

Namely, since pH of an aqueous solution in which cerium is precipitated is different from that of an aqueous solution in which zirconium is precipitated when each of them is precipitated, the composition of a coprecipitate is not uniform in the coprecipitation method in which the coprecipitate is coprecipitated in the mixed aqueous solution. As a result, a dissolution is hardly occurred at the stage of coprecipitate. Further, in the impregnation method, there are two cases: (1) a powder of ceria is impregnated in an aqueous solution containing salt of zirconium and (2) a powder of zirconia is impregnated in an aqueous solution containing salt of cerium. In either case, the composition of whole particles is not uniform because a primary particle is large. As a result, a dissolution is hardly promoted Therefore, in both methods, the dissolution is occurred by heat treatment. The heat treatment is performed at the temperature of 500–900° C. in the coprecipitation method, and 700–1200° C. in the impregnation method. Though, the dissolution is not complete. Furthermore, in both methods, a neck is formed between particles due to heat treatment on the powder, and the dissolution is promoted by the neck. In accordance with this, a grain growth and sintering are promoted. So, a specific surface area of the powder is decreased, and a particle diameter of a crystallite is increased. Moreover, once solid solution particle of oxides grow large, they cannot be easily pulverized.

For example, the degree of dissolution of the solid solution of oxides obtained by the process disclosed in Japanese Unexamined Patent Publication No. 55315/1992 is at most 40%. Furthermore, the degree of dissolution of the solid solution of oxides obtained by the process disclosed in Japanese Unexamined Patent Publication No. 284847/1992 is not more than 20%. Thus, in such conventional solid solution of oxides comprising ceria and zirconia having low degree of dissolution, an oxygen storage capacity (called OSC hereafter) of ceria is small, namely, at most 100–150 $\mu molO_2/g$. Furthermore, if the temperature is not more than 500° C., the oxygen adsorption and discharge ability is not satisfactorily exhibited, and the oxygen storage ability is poor.

It is known that the degree of dissolution of the solid solution of oxides comprising ceria and zirconia is almost 100% when the heat treatment is fully performed at the temperature of approximately 1600° C. However, in this case, although OSC is large, an average diameter of a crystallite is not less than 1000 nm. As a result, the specific surface area is small, and an oxygen adsorption and discharge speed at the period of transition is regulated by the small specific surface area. Therefore, it has no practical use as a promotor.

SUMMARY OF THE INVENTION

The present invention has been developed in view of the aforementioned circumstances. It is therefore an object of the present invention to provide a solid solution particle of oxides which has small average diameter of a crystallite and large specific surface area, and which improves capacities as the solid solution of oxides such as an oxygen storage ability due to high degree of dissolution, and to provide a process for producing the solid solution particle of oxides easily and surely. Furthermore, it is also an object of the present invention to provide a catalyst for purifying exhaust gases having excellent purifying performance which satisfies restrictions on exhaust gases in recent years and the near future by employing a solid solution of oxides comprising ceria and zirconia which has good oxygen storage ability, that is, OSC and high oxygen adsorption and discharge speed.

According to a first aspect of the present invention, a solid solution particle of oxides comprises crystallites having an average diameter of not more than 100 nm. The crystallites comprises a first oxide and a second oxide dissolved into the first oxide having a dissolution degree to the first oxide of not less than 50%.

It is preferable that the solid solution particle aggregates to a powder. than 1 $m^2/g$.

According to a second aspect of the present invention, a solid solution particle of oxides comprises crystallites having an average diameter of not more than 100 nm. The crystallites comprises ceria and zirconia dissolved into the ceria having a dissolution degree to the ceria of not less than 50%.

It is preferable that a ratio of the number of cerium atoms to the number of zirconium atoms in the particle is $0.25 \leq Zr/(Ce+Zr) \leq 0.75$.

According to a third aspect of the present invention, a solid solution particle of oxides comprises crystallites. The crystallites comprises ceria, zirconia dissolved into the ceria and at least one oxide of one element selected from the group consisting of alkaline-earth elements and rare-earth elements except cerium. The oxide is dissolved into the ceria.

It is preferable that a ratio of the number of atoms of at least one element to the number of cerium and zirconium atoms in the ceria and the zirconia is $0<M/(Ce+Zr+M) \leq 0.15$ wherein M is at least one oxide.

It is preferable that the crystallites have an average diameter of not more than 10 nm.

According to the first to third aspects of the present invention, it is more preferable that an average diameter of crystallite of the solid solution particle of oxides is not more than 10 nm, and that a specific surface area is not less than 20 $m^2/g$, most preferably, not less than 50 $m^2/g$.

According to a fourth aspect of the present invention, a process for producing a solid solution particle of oxides comprises a first step of obtaining a precipitate by adding a surfactant and an alkaline substance to an aqueous solution of a plurality of elements to be oxides, and a second step of obtaining a solid solution particle of oxides by heating the precipitate. The solid solution particle of oxides comprises crystallites having an average diameter of not more than 100 nm. The crystallites comprises a first oxide and a second oxide dissolved into the first oxide having a dissolution degree to the first oxide of not less than 50%.

It is preferable that the elements are cerium (IV) and zirconium.

According to a fifth aspect of the present invention, a process for producing a solid solution particle of oxides comprises a first step of obtaining a precipitate by adding a hydrogen peroxide, a surfactant and an alkaline substance to an aqueous solution of cerium (III) and zirconia, and a second step of obtaining a solid solution particle of oxides by heating the precipitate. The solid solution particle of oxides comprises crystallites having an average diameter of not more than 100 nm. The crystallites comprises ceria and zirconia dissolved into the ceria having a dissolution degree to the ceria of not less than 50%.

According to the fourth and fifth aspects of the present invention, it is preferable that a critical micelle concentration of the surfactant is not more than 0.1 mol/liter. Further, it is preferable that the shape of micelle formed by the surfactant is sphere and the like with a narrow space therein.

According to a sixth aspect of the present invention, a process for producing a solid solution particle of oxides comprises a first step of obtaining a precipitate by adding an alkaline substance to an aqueous solution in which plural kinds of elements as oxide are dissolved while the aqueous solution is subjected to a high-speed agitation at high rate of shear of not less than $10^3$ $sec^{-1}$, and a second step of obtaining a solid solution particle of oxides by heating the precipitate. The solid solution particle of oxides comprises crystallites having an average diameter of not more than 100 nm. The crystallites comprises a first oxide and a second oxide dissolved into the first oxide having a dissolution degree to the first oxide of not less than 50%.

According to a seventh aspect of the present invention, a process for producing a solid solution particle of oxides comprises a first step of obtaining a precipitate by adding an alkaline substance to an aqueous solution in which plural kinds of elements as oxide are dissolved, and a second step of obtaining a solid solution particle by heating the precipitate in a reducing atmosphere. The solid solution particle of oxides comprises crystallites having an average diameter of not more than 100 nm. The crystallites comprises a first oxide and a second oxide dissolved into the first oxide having a dissolution degree to the first oxide of not less than 50%.

According to the fourth to seventh aspects of the present invention, it is more preferable that an average diameter of crystallite of the solid solution particle of oxides is not more than 10 nm, and that a specific surface area is not less than 20 $m^2/g$, most preferably, not less than 50 $m^2/g$.

According to an eighth aspect of the present invention, a catalyst for purifying exhaust gases comprises a support comprising a particle containing a solid solution of oxides. The solid solution of oxides comprises crystallites having an average diameter of not more than 100 nm. The crystallites comprises ceria, zirconia dissolved into the ceria having a dissolution degree to the ceria of not less than 50% and a noble metal loaded on the support.

According to a ninth aspect of the present invention, a catalyst for purifying exhaust gases comprises a promotor comprising a particle containing a solid solution of oxides. The solid solution of oxides comprises crystallites having an average diameter of not more than 100 nm. The crystallites comprises a first oxide, a second oxide dissolved into the first oxide having a dissolution degree to the first oxide of not less than 50% and a noble metal loaded on the support.

According to the eighth aspect and the ninth aspect of the present invention, in the catalyst for purifying exhaust gases, a specific surface area of the particle is not less than 5 m$^2$/g. It is preferable that a support of a heat-resistant inorganic particle (for example, alumina, silica, titania, zirconia and the like) is added and mixed. As a result, a solid solution particle of oxides comprising ceria and zirconia is further highly dispersed.

According to the eighth aspect and the ninth aspect of the present invention, in the catalyst for purifying exhaust gases, an average diameter of crystallite is not more than 50 nm.

The degree of dissolution in the present invention is the value calculated by the following formula:

degree of dissolution (%)=100×(an amount of an oxide B which is dissolved into a total amount of an oxide A)/a total amount of an oxide B.

In this formula, it is supposed that the oxide B is uniformly dissolved into the total amount of the oxide A.

For example, as for a solid solution of oxides comprising ceria and zirconia, ceria corresponds to the oxide A, and zirconia corresponds to the oxide B. Further, the degree of dissolution is represented by the following formula (1):

degree of dissolution (%)=100×(an amount of zirconia which is dissolved into a total amount of ceria)/a total amount of zirconia.

As for the solid solution of oxides comprising ceria and zirconia (the degree of dissolution being 100%), the relationship between a concentration of zirconia x (mol %) and a lattice constant a (Angstrom) is represented by the following formula (2):

$x=(5.423-a)/0.003$.

The formula (2) is defined as follows:

A solid solution of oxides is prepared in the same manner as that of the first preferred embodiment (described later) while increasing an amount of a surfactant and changing in each mixing ratio of ceria and zircornia, and a lattice constant is measured. The value of the lattice constant is close to a predetermined value. FIG. 4 shows an example of the composition in which ceria/zirconia=5/5. Such measurement is performed at each composition. FIG. 7 shows the result of plotting values of lattice constants which are obtained in an area showing a large amount of surfactants, with reference to a concentration of zirconia. These values are sorted out by a least square method to define the formula (2).

In FIG. 7, when the concentration of zirconia is respectively 0% and 100%, each plot is the value which is shown in JCPDS Joint Committee on Powder Diffraction Standards) card. Each plot in FIG. 7 is in accordance with the law of Vegard, and the formula (2) shows the relationship between the concentration of zirconia and the lattice constant.

Based on the formula (1) and the formula (2), the degree of dissolution of the solid solution of oxides comprising ceria and zirconia is represented by the following formula (3):

$S=100\times(x/C)\times[(100-C)/(100-x)]$

In the formula (3), x is calculated by the formula (2). A percentage content C of zirconia in a sample is calculated by a mixing ratio of cerium and zirconium.

According to the first aspect and the second aspect of the present invention, in the solid solution particle of oxides, the degree of dissolution of oxide into the solid solution is not less than 50%. When the degree of dissolution is less than 50%, a desired property cannot be obtained. As for the solid solution comprising ceria and zirconia, when the degree of dissolution is less than 50%, OSC of the particle is small, namely, not more than 150 $\mu$molO$_2$/g. However, when the degree of dissolution is not less than 50%, OSC is not less than 250–800 $\mu$molO$_2$/g, and the oxygen storage ability is remarkably excellent.

When not less than two kinds of oxides B, C and the like is dissolved into the oxide A, the degree of dissolution of each of oxides B, C and the like into the oxide A is not less than 50%. Therefore, the degree of dissolution of each oxide is calculated by the following formula:

degree of dissolution (%) of the oxide B=100×(an amount of the oxide B which is dissolved into a total amount of the oxide A)/a total amount of the oxide B, and degree of dissolution (%) of the oxide C=100×(an amount of the oxide C which is dissolved into a total amount of the oxide A)/a total amount of the oxide C.

As above-described, it is necessary that the degree of dissolution of each oxide is not less than 50%.

In the solid solution particle of oxides of the present invention, the average diameter of crystallite in the particle is not more than 100 nm. Such size of the crystallite is calculated by the formula of Sherrer based on a full width at half maximum of an X-ray diffraction peak as follows:

$D=k\lambda/(\beta \cos \theta)$ wherein k: a constant 0.9, $\lambda$: an X-ray wave length (Å), $\beta$: a diffraction ray width of a sample—a diffraction ray width of a standard sample (radian), and $\theta$: a diffraction angle (degree).

When the average diameter of the crystallite is not more than 100 nm, the crystallite is not dense filling, and the particle has pores between crystallites. When the average diameter of the crystallite is more than 100 nm, a pore volume and a specific surface area are decreased, and the heat resistance is deteriorated. It is preferable that the specific surface area is not less than 1 m$^2$/g, more preferably, not less than 20 m$^2$/g, most preferably, not less than 50 m$^2$/g.

In the solid solution particle of oxides of the present invention, for example, as for the solid solution comprising ceria and zirconia, zirconium is substituted for a part of cerium while maintaining a fluorite structure of a cerium (IV) oxide to form a solid solution. In the solid solution, zirconium is fully dissolved, and a skeleton of zirconium is formed. As a result, a cubic structure of a crystallite is stable, and the cubic structure can be maintained even if a large amount of oxygen is discharged. Although such organization is not clearly known, it is supposed that oxygen easily moves in the cubic structure so that it shows excellent oxygen storage ability as compared with a tetragonal structure or a monoclinic structure.

Since the average diameter of crystallite is not more than 100 nm, a grain boundary between crystallites comes to be large, and an oxygen ion easily moves in the grain boundary. So, the oxygen adsorption and discharge speed comes to be very high, and the oxygen storage ability is further improved. Since an oxygen adsorption and discharge is performed on the surface, when the specific surface area comes to be large, namely, not less than 1 $m^2/g$, the oxygen adsorption and discharge speed comes to be very high, and OSC and the oxygen storage ability are excellent.

As for the solid solution comprising ceria and zirconia, it is preferable that the ratio of the number of cerium atoms to the number of zirconium atoms in the particle is $0.25 \leq Zr/(Ce+Zr) \leq 0.75$, more preferably, $0.4 \leq Zr/(Ce+Zr) \leq 0.6$. When the percentage content of zirconia is not more than 25 mol %, an action for forming a skeleton of zirconium in the crystallite of the solid solution is weakened. So, it is difficult to maintain a cubic fluorite structure if oxygen were released to some degree. As a result, oxygen cannot be released, and OSC is degraded. Furthermore, the oxygen storage ability depends on a change in number of valent of cerium (III) and cerium (IV). So, when the percentage content of zirconium is not less than 75 mol %, an absolute amount of cerium is insufficient, and OSC is degraded.

According to the second aspect of the present invention, the solid solution particle of oxides is not a thermodynamically stable phase. So, when it is used in an oxidizing atmosphere, the degree of dissolution is degraded. In this case, at least one oxide of one element selected from the group consisting of alkaline-earth elements and rare-earth elements except cerium is added to ceria and zirconia in the particle so that the solid solution phase of the solid solution particle of oxides can be stabilized.

According to the third aspect of the present invention, the above added oxide coexists with the solid solution particle of oxides comprising ceria and zirconia. It is enough that a part of the added oxide is dissolved into the solid solution phase of the solid solution particle of oxides. Namely, it is unnecessary that the oxide entirely is dissolved into the solid solution phase of the solid solution particle of oxides. It is preferable that a molar ratio of at least one oxide (M) of one element selected from the group consisting of alkaline-earth elements and rare-earth elements except cerium to ceria and zirconia is $0<M/(Ce+Zr+M) \leq 0.15$. It is preferable that the average diameter of crystallite of the solid solution particle of oxides is not more than 10 nm, and that the specific surface area is not less than 20 $m^2/g$. It is more preferable that the specific surface area is not less than 50 $m^2/g$.

The addition of at least one oxide of one element selected from the group consisting of alkaline-earth elements and rare-earth elements except cerium promotes stability of the solid solution phase of the solid solution particle comprising ceria and zirconia in an oxidizing atmosphere having a temperature of not less than 900° C. The addition of the oxide of alkaline-earth elements or the oxide of rare-earth elements except cerium is hardly effective for promoting OSC of the solid solution particle of oxides which maintains the condition at the time of production. The solid solution particle comprising ceria and zirconia is rather excellent in OSC. However, in case of using in an oxidizing atmosphere having high temperature for a long time of period, the solid solution phase of the solid solution particle comprising only ceria and zirconia is separated into two phases, and OSC is degraded. Under such circumstances, the solid solution phase of the solid solution particle in which the oxide of alkaline-earth elements or the oxide of rare-earth elements except cerium is relatively stable so that, after using, it shows relatively larger OSC than that of the solid solution particle comprising ceria and zirconia.

When the ratio of the number of atoms of at least one oxide (M) of one element selected from the group consisting of alkaline-earth elements and rare-earth elements except cerium to the number of cerium and zirconium atoms in the ceria and the zirconia is larger than $0<M/(Ce+Zr+M) \leq 0.15$, on the contrary, OSC is degraded. Furthermore, there is any economical disadvantage.

According to the first to third aspects of the present invention, when the average diameter of crystallite is more than 10 nm, or when the specific surface area is less than 20 $m^2/g$, the oxygen adsorption and discharge speed come to be slow. So, in the atmosphere in which an oxygen partial pressure is rapidly changed, OSC substantially comes to be degraded.

When the oxide of alkaline-earth elements or the oxide of rare-earth elements except cerium is dissolved into the solid solution comprising ceria and zirconia, the lattice constant of crystallite is changed. So, it is difficult to judge the degree of dissolution of zirconia into ceria on the basis of the lattice constant. However, according to the shape of the X-ray diffraction peak, it is possible to judge whether or not the obtained single solid solution phase is separated into a phase comprising mainly cerium and a phase comprising mainly zirconium.

According to the fourth aspect of the present invention, a precipitate is obtained by adding the surfactant and the alkaline substance to the aqueous solution in which plural kinds of elements as oxide are dissolved. In this aspect, an action of the surfactant is not clearly known, but it is supposed as follows. In the condition that the aqueous solution is neutralized by the alkaline substance, the element as oxide is precipitated as hydroxide or oxide having very minute diameter of not more than several nm. Conventionally, the precipitate is dried as it is. However, in the present invention, plural kinds of precipitate particles are uniformly taken into the micelle of the surfactant by adding the surfactant. In the micelle, neutralization, precipitation and aging are progressed, and the solid solution particle is formed in the narrow space in which plural components are uniformly contained and condensed. Further, due to an effect of dispersion of the surfactant, dispersability of the precipitate particles taken into the micelle of the surfactant is improved, and the degree of contact between ceria and zirconia particles in the micelle is promoted by small segregation. As a result, the degree of dissolution is promoted, and the average diameter of crystallite can be shortened.

The surfactant can be added prior to, simultaneously with or after the addition of the alkaline substance. However, when the addition of the surfactant is too late, segregation is occurred. So, it is preferable that the surfactant is added prior to or simultaneously with the addition of the alkaline substance.

A compound of the element to compose the oxide as an aqueous solution contains cerium nitrate (III), cerium nitrate (IV) ammonium, cerium chloride (III), cerium sulfate (III), cerium sulfate (IV), zirconium oxynitrate, zirconium oxychloride and the like. As the alkaline substance, any element which shows alkaline as an aqueous solution can be employed. Ammonia is especially preferable because it is easily separated at the time of heating. However, other alkaline substances such as hydroxide of an alkaline metal can be employed because it is easily removed by washing.

As the surfactant, any ion in a cationic group, an anionic group and a nonionic group can be employed. It is preferable that the surfactant which can form the narrow space in the micelle, for example, the surfactant which easily forms a spherical micelle is employed. Furthermore, it is preferable that the critical micelle concentration of the surfactant is not more than 0.1 mol/liter, more preferably, not more than 0.01 mol/liter.

The surfactant contains at least one selected from the group consisting of (1) anionic surfactants such as alkyl benzene sulfonic acid and salt thereof; α olefin sulfonic acid and salt thereof; alkyl sulfuric acid ester salt; alkyl ether sulfuric acid ester salt; phenyl ether sulfuric acid ester salt; methyl tauronate; sulfo succinate; ether sulfate; alkyl sulfate; ether sulfonate; saturated fatty acid and salt thereof; unsaturated fatty acid such as oleic acid and salt thereof; other carboxylic acid; sulfonic acid; sulfuric acid; phosphoric acid; phenol derivative and the like; (2) nonionic surfactants such as polyoxyethylene polypropylene alkyl ether; polyoxyethylene alkyl ether; polyoxyethylene alkyl phenyl ether; polyoxyethylene polystyryl phenyl ether; polyoxyethylene polyoxypropylene alkyl ether; polyoxyethylene polyoxypropylene grycol; fatty acid partial ester of polyatomic alcohol such as polyatomic alcohol, glycol, glycerin, sorbitol, mannitol, pentaesritol, saccharose and the like; polyoxyethylene fatty acid partial ester of polyatomic alcohol such as polyatomic alcohol, glycol, glycerin, sorbitol, mannitol, pentaesritol, saccharose and the like; polyoxyethylene fatty acid ester, polyoxymethylenes castor oil; polyglycerol fatty acid ester; fatty acid diethanolamide; polyoxyethylene alkylamine; triethanolamine fatty acid partial ester; trialkylamine oxide and the like; (3) cationic surfactants such as primary fatty amino acid; secondary fatty amino acid; tertiary fatty amino acid; quartenary ammonium salt such as tetraalkyl ammonium salt, trialkyl benzene ammonium salt, alkyl pyridinium salt, 2-alkyl-1-alkyl-1-hydroxyethyl imidazolinium salt, N,N-dialkyl morpholinium salt, polyethylene polyamine fatty acid amide salt and the like and (4) biionic surfactants such as betaine compound.

The critical micelle concentration (CMC) is the lowest concentration which is necessary for forming the micelle in the surfactant.

It is preferable that an additional amount of the surfactant is in the range from 1–50 parts by weight with reference to 100 parts by weight of the obtained solid solution particle of oxides. When the additional amount is not less than 1 part by weight, the degree of dissolution is further improved. When the additional amount exceeds 50 parts by weight, there is fear that the surfactant doesn't form micelle effectively.

When the solid solution comprising ceria and zirconia is produced, the number of valent of cerium should be noted. As for cerium (IV), zirconia is relatively easily dissolved into ceria, so it is possible to produce the solid solution particle of oxides by the above process. However, as for cerium (III), since zirconia is not dissolved into ceria, it is preferable that other process is adopted.

According to the fourth aspect of the present invention, cerium (III) and hydrogen peroxide form a complex ion, and it is oxidized to obtain cerium (IV). As a result, zirconia can be easily dissolved into ceria.

It is preferable that an additional amount of hydrogen peroxide is not less than one fourth of an amount of cerium ion. When the additional amount of hydrogen peroxide is less than one fourth of the amount of cerium ion, zirconia is not satisfactorily dissolved into ceria. Too much additional amounts of hydrogen peroxide doesn't have harmful influence, but there is no advantage in economical viewpoint. So, it is more preferable that the additional amount of hydrogen peroxide is in the range from a half to twice of the amount of cerium ion.

Hydrogen peroxide can be added prior to, simultaneously with or after the addition of the alkaline substance and the surfactant. Furthermore, hydrogen peroxide is especially a preferable oxidizing agent because an after treatment is not required. However, other oxidizing agents such as an oxygen gas; peroxide such as ozone, perchloric acid, permanganic acid and the like can be employed.

According to the sixth aspect of the present invention, a precipitate is obtained by adding the alkaline substance to the aqueous solution in which plural kinds of elements as oxide are dissolved while the aqueous solution is subjected to a high-speed agitation at high rate of shear of not less than $10^3$ sec$^{-1}$, preferably, $10^4$ sec$^{-1}$. It is unavoidable that a component in the precipitate particle as a neutralization product is somewhat segregated. In the present aspect, such segregation is equalized by powerful agitation. At the same time, dispersability is improved. So, the degree of contacting cerium source with zirconium source is further improved.

When a coprecipitate is obtained from a mixed solution comprising salt of cerium and salt of zirconium, same kinds of precipitate particles are likely to be collected because pH of an aqueous solution in which cerium is precipitated is different from that of an aqueous solution in which zirconium is precipitated at the time of precipitation. However, by performing the high-speed agitation at high rate of shear, the collected precipitate particles are destroyed, and the precipitate particles are well mixed.

Therefore, in this aspect of the present invention, the average diameter of crystallite can be further shortened while the degree of dissolution is improved. When the rate of shear is less than $10^3$ sec$^{-1}$, an effect for promoting dissolution is not satisfactory. The rate of shear V is represented by the following formula:

$$V = v/D$$

wherein v: speed difference (m/sec) between a rotor and stator of an agitator, and D: a clearance between the rotor and the stator.

When the process disclosed in the sixth aspect of the present invention is applied to the processes disclosed in the fourth and fifth aspects of the present invention, dissolution is further promoted. When cerium (III) is employed, dissolution is promoted. So, by utilizing the present invention, it is possible to produce the solid solution particle of oxides having high degree of dissolution without oxidizing cerium (III) by hydrogen peroxide into cerium (IV) as shown in the fifth aspect of the present invention.

According to these aspects of the present invention, the precipitate is heated, and the element of precipitate is changed to be the oxide in the second step. The heating atmosphere can be an oxidizing atmosphere, a reducing atmosphere or a neutral atmosphere. Oxygen contained in the aqueous solution as the material is concerned with such change of the element in the precipitate into the oxide. Namely, the element in the precipitate is oxidized at the time of heating. Therefore, even when the precipitate is heated in the reducing atmosphere, the oxide can be obtained.

According to the seventh aspect of the present invention, it is possible to obtain the solid solution particle of oxides in which the degree of dissolution is high and the average diameter of crystallite is small only by heating the precipitate in the reducing atmosphere in the second step without adding the surfactant to the aqueous solution.

The reason thereof is as follows.

For example, as for the solid solution particle comprising ceria and zirconia, the heating atmosphere is the reducing atmosphere. So, cerium atom becomes trivalent in the oxide, and an oxygen deficiency is occurred. As a result, cerium and zirconium are easily dispersed with each other, and ceria and zirconia are promoted to be easily dissolved. Furthermore, zirconium is regularly arranged, and the skeleton of zirconia is surely formed in ceria. Moreover, in this aspect, dissolution is satisfactorily progressed at the temperature of not more than 1300° C. although the temperature of not less than 1600° C. is required for obtaining satisfactory dissolution in the heat treatment in an air atmosphere. Therefore, the size of crystallite is small.

The reducing atmosphere preferably contains gas such as carbon monoxide, hydrogen, hydrocarbon and the like.

Even in the reducing atmosphere, the oxide can be obtained because the element in the precipitate is oxidized by the oxygen contained in the aqueous solution as material at the time of heating.

When the reducing atmosphere is prepared by employing CO, a concentration of CO is preferably in the range from 0.1 to 30%. In such range, the degree of dissolution is further promoted.

A method for collecting the precipitate can be a method for drying a filter cake after most amounts of water is squeezed from the precipitate by a filter press, a method for spraying and drying the mixture comprising precipitate and water by a spray drier. It is preferable that the precipitate is dried at the temperature of not less than 100° C., more preferably, not less than 200° C., most preferably, not less than 300° C. because ammonium nitrate which is formed by neutralization is easily decomposed and removed.

According to the fourth to seventh aspects of the present invention, the method for heating the precipitate can be any method. Furthermore, it is preferable that the heating temperature is 150–600° C. When the heating temperature is less than 150° C., the oxide is hardly obtained. When the heating temperature is more than 600° C., the obtained oxide is sintered, and there is fear that the particles are aggregated.

At the time of drying the precipitate while collecting it, when the heating temperature reaches 150–600° C., it is possible that the drying step and the heating step can be performed together.

It is preferable that the solid solution particle of oxides is subjected to an after treatment as follows. Namely, it is preferable that the solid solution particle of oxides is subjected to heat treatment at the temperature of 800–1300° C. in order to promote dissolution. In this case, it is possible to surely form the skeleton of zirconia in ceria to promote oxygen storage ability. Thus, at the time of heat treatment in the reducing atmosphere, a past of oxygen in the solid solution lacks, and a part of cation (cerium) is reduced to lower valent (III). However, after that, when the solid solution particle of oxides is heated to not less than approximately 300° C. in the atmosphere, it is easily recovered to an original state. Therefore, in the process of cooling after heat treatment, a treatment for contacting the solid solution particle of oxides with the atmosphere at the temperature of not more than approximately 600° C., and for recovering the original valent can be performed.

At the time of heating the precipitate, when it is heated by a spray-drying method, the solid solution particle of oxides is obtained in powdery condition (a drying substance). Furthermore, when the precipitate is heated by other methods, the solid solution particle of oxides is in the condition of lump. So, it is subjected to a dry grinding by a hammer crusher, a ball mill, a vibrating mill and the like to obtain a powder comprising solid solution particle of oxides.

According to the eighth aspect of the present invention, in the catalyst, the solid solution particle of oxides produced by the above method is employed as the support. Namely, the support comprises a solid solution particle in which ceria and zirconia are dissolved. A honeycomb-shaped support base or a pellet-shaped support base can be formed out of the solid solution particle comprising ceria and zirconia itself, or a support base can be formed by coating with the particle a heat resistance inorganic substance such as cordierite or a metallic base material.

According to this aspect of the present invention, the support contains alumina ($Al_2O_3$), silica ($SiO_2$), silica-alumina, titania ($TiO_2$), zirconia ($ZrO_2$), zeolite, potassium titanate oxide or composite oxide of these oxides. The support base can be formed out of these oxides, or the support base can be formed by coating with a powder of these oxides a heat resistance inorganic substance such as cordierite or a metallic base material. The support base can be honeycomb-shaped or pellet-shaped as is conventional.

According to the ninth aspect of the present invention, the catalyst can be a mixed substance comprising the promotor and the support on which the noble metal is loaded. In this case, the noble metal can be loaded on the promotor. Furthermore, in the catalyst, the promotor and the noble metal are loaded on the support. In this case, the promotor and the noble metal can be loaded on the same support, or the promotor and the noble metal are respectively loaded on each different support.

The noble metal contains platinum (Pt), palladium (Pd), rhodium (Rh), silver (Ag), gold (Au), and at least one kind or plural kinds of these elements can be employed. Moreover, a base metal such as iron (Fe), molybdenum (Mo), tungsten (W), nickel (Ni), chromium (Cr), manganese (Mg), cobalt (Co), copper (Cu) and the like can be employed together. It is preferable that a loading amount of the noble metal is 0.1–10 g with reference to 1 liter of the catalyst volume. When the loading amount is less than 0.1 g, the purifying performance is not satisfactory. When the loading amount is more than 10 g, any further advantage in performance is observed, while disadvantage is occurred in an economical viewpoint.

According to the eighth and ninth aspects of the present invention, the promotor is the particle containing the solid solution particle of oxides in which ceria and zirconia are dissolved with each other. The degree of dissolution of zirconia into ceria in the particle is not less than 50%, and the average diameter of crystallite is not more than 100 nm. When the degree of dissolution is less than 50%, OSC of ceria is small, namely, not more than approximately 150 $\mu molO_2/g$. However, when the degree of dissolution is more than 50%, OSC of ceria is not less than 250–800 $\mu molO_2/g$. So, the oxygen storage ability is remarkably excellent.

In the present catalyst, the average diameter of crystallite in the solid solution particle comprising ceria and zirconia is not more than 100 nm. When the average diameter of crystallite is not more than 100 nm, the crystallite is not dense filling, and the solid solution particle has a pore between crystallites. As a result, the specific surface area is large, and an effect for adsorbing components which are purified is excellent. However, when the average diameter is more than 100 nm, the pore volume and the specific surface area are decreased, and the heat resistance is deteriorated. Because of the same reason, it is preferable that the specific surface area is not less than 5 $m^2/g$.

The solid solution comprising ceria and zirconia has a crystallite having a cubic structure, and it shows excellent OSC as compared with a tetragonal structure or a monoclinic structure.

When the average diameter of crystallite is not more than 100 nm, the grain boundary between crystallites comes to be large, and the oxygen ion is easily moves in the grain boundary. As a result, the oxygen adsorption and discharge speed comes to be sufficiently large, and the reaction for oxidizing and reducing CO, HC and NOx can be rapidly performed. So, it is possible to obtain excellent purifying performance. When the specific surface area of the particle is not less than 5 m$^2$/g, the oxygen adsorption and discharge is performed on the surface of the particle. So, the purifying performance is further promoted. Moreover, it is preferable that the average diameter of crystallite is not more than 50 nm. In this case, the oxygen adsorption and discharge speed comes to be high.

In the solid solution particle comprising ceria and zirconia, it is preferable that the ratio of the number of cerium atoms to the number of zirconium atoms is $0.95 \leq Zr/(Ce+Zr) \leq 0.7.5$, preferably, $0.4 \leq Zr/(Ce+Zr) \leq 0.6$. When the percentage content of zirconium is not more than 25 mol %, the action for forming the skeleton of zirconia in the crystallite of the solid solution is weakened. As a result, it is difficult to maintain the cubic fluorite structure, so OSC is degraded. Moreover, the oxygen adsorption and discharge ability depends on the change in the number of valent of cerium (III) and cerium (IV). When the percentage content of zirconium is not less than 75 mol %, OSC is degraded due to the lack of the absolute amount of cerium.

When the solid solution particle comprising ceria and zirconia which is mixed with the support such as alumina is employed as the promotor, the solid solution particle is highly dispersed. As a result, the contacting surface of the particle with exhaust gases is highly maintained, and the deterioration in activity caused by sintering between them is hardly occurred. Therefore, it is possible to keep the solid solution particle stable until the temperature rises to high temperature.

Similarly, it is possible to promote the purifying performance after duration also in the catalyst in which rare-earth oxides, alkaline-earth elements or alkaline metal are added.

The solid solution particle of oxides of the present invention shows high degree of dissolution and small average diameter of the crystallite. When the solid solution comprises ceria and zirconia, it has the crystallite structure in which zirconium was substituted for a part of cerium while maintaining fluorite structure of ceria. So, OSC of ceria was promoted in twice as much as that of conventional ceria. Furthermore, the adsorption and discharge speed is high, and the oxygen storage ability is excellent.

According to the process for producing the solid solution particle of oxides in the present invention, by adding the surfactant, it is supposed that the particle is formed by uniformly collecting plural elements in a small clearance in the micelle. So, almost perfect solid solution can be formed while maintaining the average diameter of the crystallite. Therefore, it is possible to easily and surely produce the solid solution of oxides. Furthermore, it is possible to maintain high degree of dissolution by addition of hydrogen peroxide even if cerium (III) is employed.

According to the process of the fourth aspect of the present invention, by strongly agitating the aqueous solution, it is supposed that the segregation of the coprecipitate is controlled to be uniformly dispersed when plural elements are coprecipitated. So, almost perfect solid solution can be formed while maintaining the average diameter of the crystallite. Therefore, it is possible to easily and surely produce the solid solution of oxides of the present invention. When cerium (III) is employed, it is possible to obtain high degree of dissolution without adding hydrogen peroxide.

According to the process of the sixth aspect of the present invention, by heating the precipitate obtained in the aqueous solution in the reducing atmosphere, almost perfect solid solution can be formed while maintaining the average diameter of the crystallite. Therefore, it is possible to easily and surely produce the solid solution of oxides of the present invention. When cerium (III) is employed, it is possible to obtain high degree of dissolution without adding hydrogen peroxide.

According to the catalyst for purifying exhaust gases in the present invention, it is possible to exhibit excellent purifying performance due to excellent oxygen storage ability, which is able to satisfy severe restrictions on exhaust gases in recent years and the near future.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
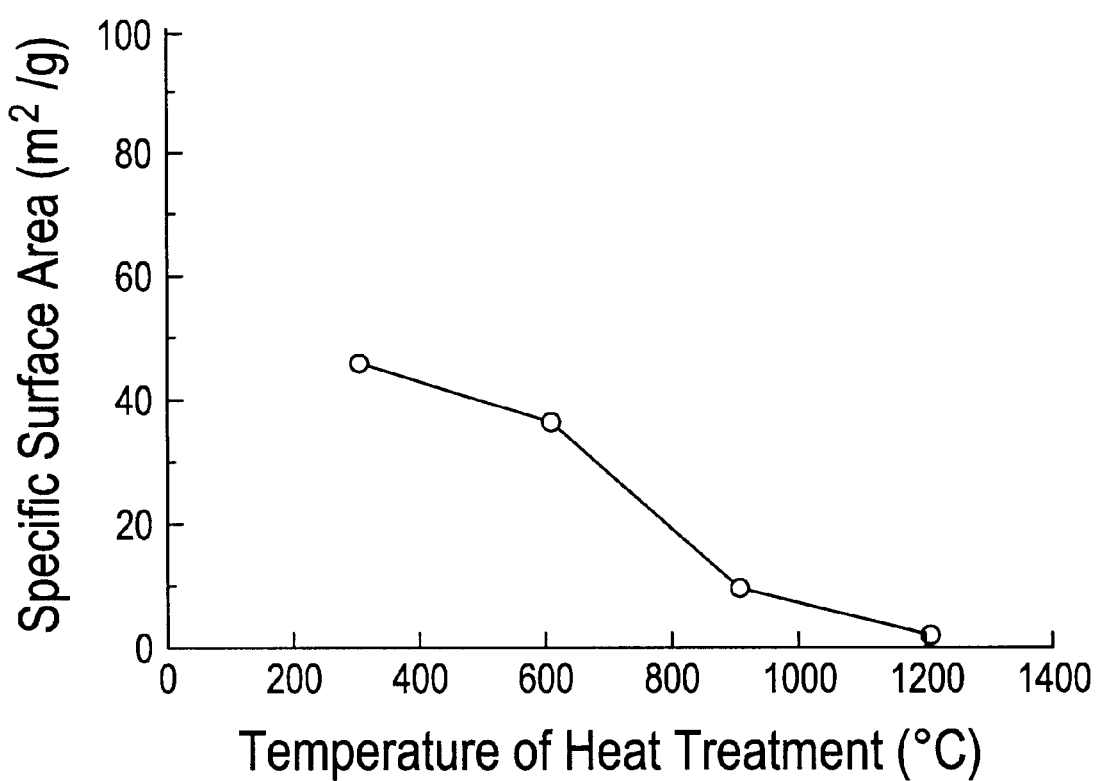
FIG. 1 is a graph for showing the relationship between the temperature of a heat treatment and a specific surface area.

The exact nature of this invention, as well as other objects and advantages thereof, will be readily apparent from consideration of the description of preferred embodiments of the present invention. The present invention is not limited by the following preferred embodiments.

First Preferred Embodiment

Cerium nitrate (III) and zirconyl nitrate were mixed in a ratio of Ce/Zr=5/5 to prepare an-aqueous solution (1). The aqueous solution (1) was neutralized by dropping an aqueous ammonia while agitating the aqueous solution (1) to obtain a precipitate. Then, an aqueous hydrogen peroxide containing hydrogen peroxide in one second molar number of that of cerium ion contained in the aqueous solution (1) and an aqueous solution containing alkyl benzene sulfonic acid in 10% by weight of that of an obtained oxide were added to the aqueous solution (1), and they were mixed and agitated to obtain a slurry.

The slurry was sprayed in an atmosphere having an introducing atmosphere temperature of 400° C. and a discharging atmosphere temperature of 250° C., and was dried by a spray-drying method. Simultaneously, coexistent ammonium nitrate was vaporized or decomposed to prepare a powder containing a solid solution particle of oxides. When the degree of dissolution of the solid solution particle of oxides was calculated by the formula (3) based on a lattice constant defined by an X-ray diffraction and a mixing ratio of a starting material, the degree of dissolution was 100%. When an average diameter of a crystallite was calculated by the formula of Scherrer based on 311 peak of an X-ray diffraction pattern, the average diameter was 10 nm. Furthermore, a specific surface area of the solid solution particle of oxides calculated by a BET method was 45 $m^2/g$.

Comparative Example 1

A powder of ceria and a powder of zirconia were mixed in a ratio of Ce/Zr=5/5 to prepare a mixed substance. The mixed substance was dispersed in water, and they were mixed by a ball mill for 48 hours to obtain a slurry. Then, the slurry was dried at the temperature of 120° C. to obtain a mixed powder.

After that, the mixed powder was introduced into an alumina heat-resistant vessel, and it was heated at the temperature of 1600° C. for 5 hours to prepare a solid solution. After cooling, the solid solution was pulverized in a mortar, and furthermore, it was pulverized in the ball mill together with water for 48 hours to prepare a solid solution particle of oxides. The degree of dissolution of the solid solution particle of oxides which was calculated in the same manner as that of the first preferred embodiment was 100%, and an average diameter of a crystallite was 1000 nm, and a specific surface area was 0.3 $m^2/g$.

Comparative Example 2

A solid solution of oxides of Comparative Example 2 was prepared in the same manner as that of the first preferred embodiment except that hydrogen peroxide and a surfactant were not employed. The degree of dissolution of the solid solution particle of oxides was 18%, and an average diameter of a crystallite was 6 nm, and a specific surface area was 80 $m^2/g$.

Comparative Example 3

A solid solution of oxides of Comparative Example 3 was prepared in the same manner as that of the first preferred embodiment except that a surfactant was not employed. The degree of dissolution of the solid solution of oxides was 38%, and an average diameter of a crystallite was 7 nm, and a specific surface area was 70 $m^2/g$.

Evaluation of Heat Resistance

Figure 2:
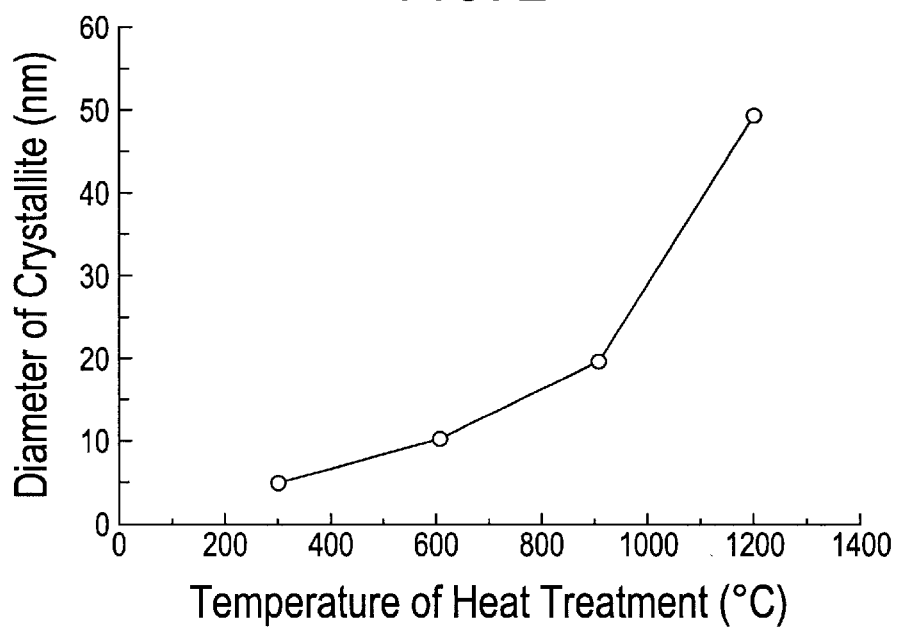
FIG. 2 is a graph for showing the relationship between the temperature of a heat treatment and an average diameter of a crystallite.

The solid solution particle of oxides of the first preferred embodiment was subjected to a heat treatment. FIGS. 1 and 2 showed the result of measuring the specific surface area and the average diameter of the crystallite after the heat treatment. Each of four standard temperatures of the heat treatment was selected from the temperature range of 350–1200° C., and the time of the heat treatment was 5 hours respectively.

As apparent from FIGS. 1 and 2, even if the solid solution of oxides of the first preferred embodiment was subjected to the heat treatment at the temperature of 1200° C., it showed large specific surface area, namely, not less than 1 $m^2/g$, and the average diameter can be maintained not more than 100 nm although the specific surface area was decreased by the heat treatment.

Measurement of OSC

As for each of the solid solution particle of oxides of the first preferred embodiment and Comparative Examples 1–3, OSC was measured respectively. A measurement of OSC was performed as follows. Hydrogen and oxygen were communicated with each other, and each sample was repeatedly oxidized and reduced. At that time, a change in weight was measured by an apparatus for thermogravimetry. As a result, OSC of the solid solution of oxides of the first preferred embodiment was 450 $\mu molO_2/g$. On the contrary, OSC of each solid solution of oxides of Comparative Examples 1–3 was comparatively small, namely, 100 $\mu molO_2/g$, 95 $\mu molO_2/g$, and 150 $\mu molO_2/g$, respectively. Such result was due to the difference in the specific surface area between the first preferred embodiment and Comparative Example 1, and also the difference in the degree of dissolution between the first preferred embodiment and Comparative Examples 2–3.

Second Preferred Embodiment

A solid solution of oxides of the second preferred embodiment was prepared in the same manner as that of the first preferred embodiment except that aqueous hydrogen peroxide was previously added to an aqueous solution comprising cerium nitrate (III) and zirconyl nitrate before dropping an aqueous ammonium. The degree of dissolution of the solid solution particle of oxides which was calculated in the same manner as that of the first preferred embodiment was 100%, and an average diameter of a crystallite was 10 nm, and a specific surface area was 45 $m^2/g$.

Third Preferred Embodiment

A solid solution of oxides of the third preferred embodiment was prepared in the same manner as that of the first preferred embodiment except that an aqueous solution of alkyl benzene sulfonic acid was previously added to an aqueous solution comprising cerium nitrate (III) and zirconyl nitrate before dropping an aqueous ammonium The degree of dissolution of the solid solution particle of oxides which was calculated in the same manner as that of the first preferred embodiment was 100%, and an average diameter of a crystallite was 12 nm, and a specific surface area was 35 $m^2/g$.

Fourth Preferred Embodiment

A solid solution of oxides of the fourth preferred embodiment was prepared in the same manner as that of the first preferred embodiment except that an aqueous solution of α olefin sulfonic acid was employed instead of an aqueous solution of alkyl benzenesulfonic acid. The degree of dissolution of the solid solution particle of oxides which was calculated in the same manner as that of the first preferred embodiment was 95%, and an average diameter of a crystallite was 8 nm, and a specific surface area was 35 $m^2/g$.

Fifth Preferred Embodiment

A solid solution of oxides of the fifth preferred embodiment was prepared in the same manner as that of the first preferred embodiment except that an aqueous solution of polyoxyethylene polypropyl alkyl ether was employed instead of an aqueous solution of alkyl benzene sulfonic acid. The degree of dissolution of the solid solution particle of oxides which was calculated in the same manner as that of the first preferred embodiment was 100%, and an average diameter of a crystallite was 8 nm, and a specific surface area was 40 $m^2/g$.

Sixth Preferred Embodiment

A solid solution of oxides of the sixth preferred embodiment was prepared in the same manner as that of the first preferred embodiment except that an aqueous solution of cetyl trimethyl ammonium chloride was employed instead of an aqueous solution of alkyl benzene sulfonic acid. The degree of dissolution of the solid solution particle of oxides which was calculated in the same manner as that of the first preferred embodiment was 95%, and an average diameter of a crystallite was 7 nm, and a specific surface area was 58 $m^2/g$.

Seventh Preferred Embodiment

A solid solution of oxides of the seventh preferred embodiment was prepared in the same manner as that of the first preferred embodiment except that an aqueous solution of monoalkyl ammonium acetate was employed instead of an aqueous solution of alkyl benzene sulfonic acid. The degree of dissolution of the solid solution particle of oxides which was calculated in the same manner as that of the first preferred embodiment was 90%, and an average diameter of a crystallite was 8 nm, and a specific surface area was 60 $m^2/g$.

Eighth Preferred Embodiment

A solid solution of oxides of the eighth preferred embodiment was prepared in the same manner as that of the first preferred embodiment except that an aqueous solution of polyoxyethylene alkyl phenyl ether was employed instead of an aqueous solution of alkyl benzene sulfonic acid. The degree of dissolution of the solid solution particle of oxide which was calculated in the same manner as that of the first preferred embodiment was 95%, and an average diameter of a crystallite was 8 nm, and a specific surface area was 50 $m^2/g$.

Ninth Preferred Embodiment

A solid solution of oxides of the ninth preferred embodiment was prepared in the same manner as that of the first preferred embodiment except that an aqueous solution of polyoxyethylene alkyl ether was employed instead of an aqueous solution of alkyl benzenesulfonic acid. The degree of dissolution of the solid solution particle of oxides which was calculated in the same manner as that of the first preferred embodiment was 95%, and an average diameter of a crystallite was 8 nm, and a specific surface area was 54 $m^2/g$.

Tenth Preferred Embodiment

A solid solution of oxides of the tenth preferred embodiment was prepared in the same manner as that of the first preferred embodiment except that an aqueous solution of polyoxyethylene alkyl amine was employed instead of an aqueous solution of alkyl benzene sulfonic acid. The degree of dissolution of the solid solution particle of oxides which was calculated in the same manner as that of the first preferred embodiment was 90%, and an average diameter of a crystallite was 6 nm, and a specific surface area was 48 $m^2/g$.

Eleventh Preferred Embodiment

A solid solution of oxides of the eleventh preferred embodiment was prepared in the same manner as that of the first preferred embodiment except that an aqueous solution of polyoxyethylene fatty acid amide was employed instead of an aqueous solution of alkyl benzene sulfonic acid. The degree of dissolution of the solid solution particle of oxides which was calculated in the same manner as that of the first preferred embodiment was 90%, and an average diameter of a crystallite was 7 nm, and a specific surface area was 62 $m^2/g$.

Twelfth Preferred Embodiment

A solid solution of oxides the twelfth preferred embodiment was prepared in the same manner as that of the first preferred embodiment except that an aqueous solution of trialkylamine oxide was employed instead of an aqueous solution of alkyl benzene sulfonic acid. The degree of dissolution of the solid solution particle of oxides which was calculated in the same manner as that of the first preferred embodiment was 95%, and an average diameter of a crystallite was 9 nm, and a specific surface area was 67 $m^2/g$.

Thirteenth Preferred Embodiment

A solid solution of oxides of the thirteenth preferred embodiment was prepared in the same manner as that of the first preferred embodiment except that an aqueous solution of polyoxyethylene alkyl methyl ammonium chloride was employed instead of an aqueous solution of alkyl benzene sulfonic acid. The degree of dissolution of the solid solution particle of oxides which was calculated in the same embodiment was 100%, and an average diameter of a crystallite was 9 nm, and a specific surface area was 37 $m^2/g$.

Fourteenth Preferred Embodiment

A solid solution of oxides of the fourteenth preferred embodiment was prepared in the same manner as that of the first preferred embodiment except that an aqueous solution of beef tallow diamine dioleic acid was employed instead of an aqueous solution of alkyl benzene sulfonic acid. The degree of dissolution of the solid solution particle of oxides which was calculated in the same manner as that of the first preferred embodiment was 100%, and an average diameter of a crystallite was 8 nm, and a specific surface area was 35 $m^2/g$.

Evaluation

According to each result of the preferred embodiments 2 to 14, all surfactants employed in these embodiments exhibited the same effect as that of alkyl benzene sulfonic acid.

Fifteenth Preferred Embodiment

Each solid solution of oxides of the fifteenth preferred embodiment was prepared in the same manner as that of the first preferred embodiment except that an additional amount of alkyl benzene sulfonic acid was variously selected from the range of 0–30% of a weight of the obtained oxide, and that a ratio of Ce/Zr in a starting material was changed. A lattice constant of a crystallite of each solid solution particle of oxides was measured by an X-ray diffraction method. The result together with a lattice constant of the solid solution particle of oxides of the first preferred embodiment was shown in FIG. 3.

Figure 4:
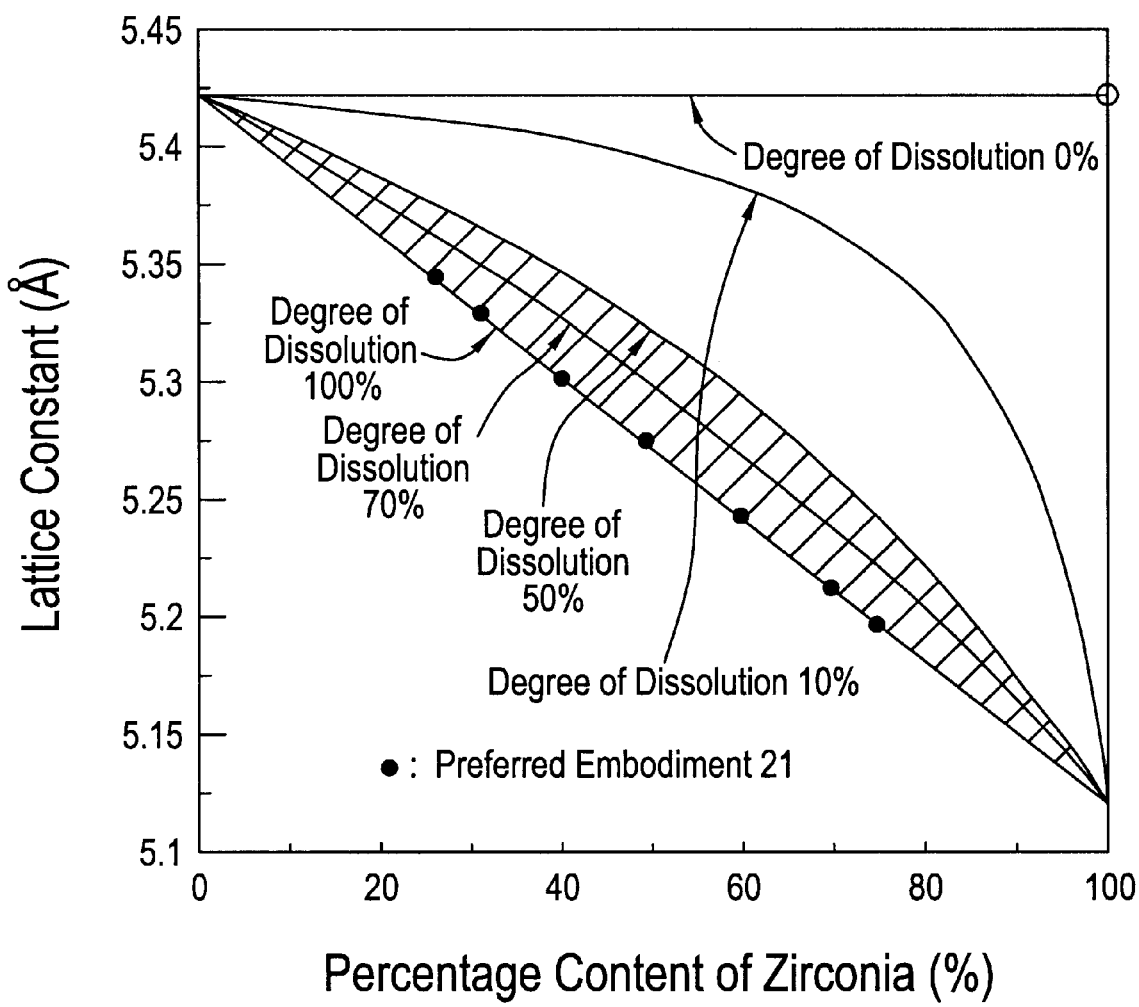
FIG. 4 is a graph for showing the relationship between a percentage content of zirconia and a lattice constant of a crystallite of a solid solution particle of oxides.
Figure 5:
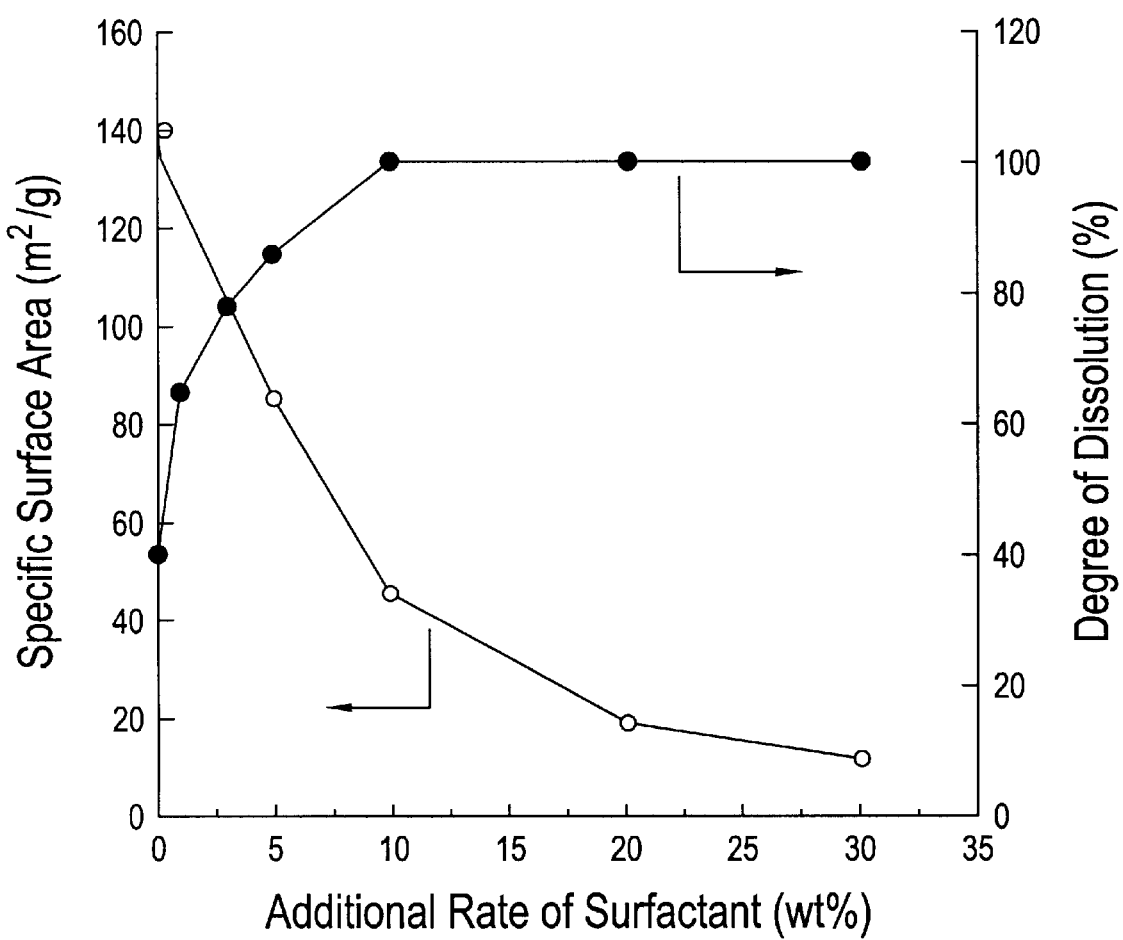
FIG. 5 is a graph for showing the relationship between an additional rate of a surfactant, the degree of dissolution of a solid solution particle of oxides and a specific surface area of a solid solution particle of oxides.

The relationship between the lattice constant and the degree of dissolution calculated by the formula (3) based on the composition (a ratio of Ce/Zr=5/5) was shown in FIG. 5. The relationship between a content amount of zirconia and the lattice constant with reference to each degree of dissolution of each solid solution comprising ceria and zirconia in each composition was shown in FIG. 4. A range corresponding to the third aspect was shown as a slant line.

With reference to each additional rate of the surfactant (Ce/Zr=5/5), a specific surface area of the solid solution particle of oxides was measured, and the result was also shown in FIG. 5.

Evaluation

Figure 3:
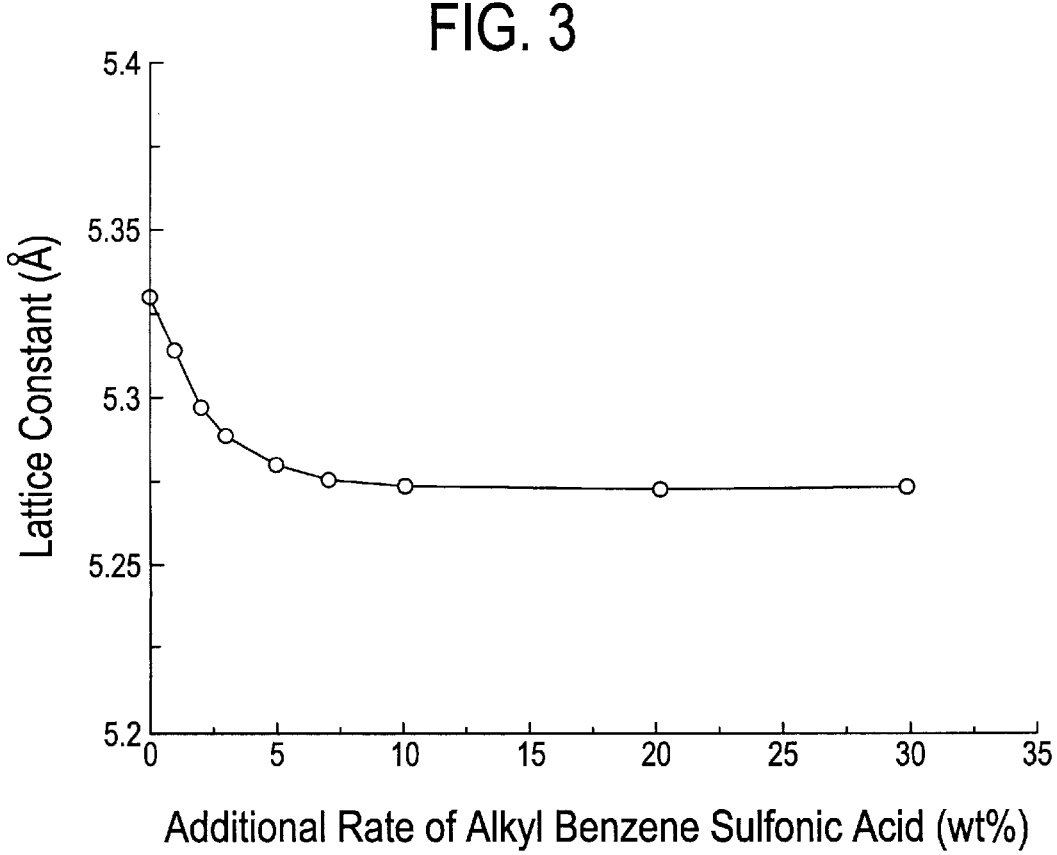
FIG. 3 is a graph for showing the relationship between an additional rate of alkyl benzene sulfonic acid and a lattice constant of a crystallite of a solid solution particle of oxides.

According to FIG. 3, as the additional amount of alkyl benzene sulfonic acid is increased, the lattice constant becomes low. When the additional amount is not less than approximately 10%, the lattice constant is almost constant, 5.275. According to FIG 4, when Ce/Zr=5/5, the degree of dissolution is 100%, and the lattice constant is 5.275. So, when the additional amount of alkyl benzene sulfonic acid is not less than 10%, it is known that the degree of dissolution is almost 100%. This fact was proved by the result of FIG. 5 in which the degree of dissolution is actually measured. Namely, it is apparent that dissolution is promoted by adding the surfactant, and it is enough to satisfy a dissolution degree of 50% that the additional rate of alkyl benzene sulfonic acid is not less than approximately 1%.

Sixteenth Preferred Embodiment

A solid solution of oxides of the sixteenth preferred embodiment was prepared in the same manner as that of the first preferred embodiment except that, after water was squeezed by the filter press, the slurry containing precipitate was heated and dried at the temperature of 300° C., and that it was mechanically pulverized. The degree of dissolution of the solid solution particle of oxides which was calculated in the same manner as that of the first preferred embodiment was 95%, and an average diameter of a crystallite was 8 nm, and a specific surface area was 60 m$^2$/g.

Seventeenth Preferred Embodiment

A solid solution of oxides of the seventeenth preferred embodiment was prepared in the same manner as that of the first preferred embodiment except that the slurry containing precipitate was brought into contact with a ceramic ball which was heated at the temperature of 250° C. to be dried, and that it was mechanically pulverized by the ball. The degree of dissolution of the solid solution particle of oxides which was calculated in the same manner as that of the first preferred embodiment was 100%, and an average diameter of a crystallite was 8 nm, and a specific surface area was 40 m$^2$/g.

Eighteenth Preferred Embodiment

A solid solution of oxides of the eighteenth preferred embodiment was prepared in the same manner as that of the first preferred embodiment except that the slurry containing precipitate was put into a vessel which was heated at the temperature of 300° C. to be heated until water and ammonium nitrate were vaporized or decomposed, and that it was mechanically pulverized. The degree of dissolution of the solid solution particle of oxides which was calculated in the same manner as that of the first preferred embodiment was 100%, and an average diameter of a crystallite was 9 nm, and a specific surface area was 35 m$^2$/g.

Evaluation

According to each result of the preferred embodiments 1 and 16 to 18, each solid solution particle of oxides was obtained by the above employed drying and pulverizing method.

Nineteenth Preferred Embodiment

Cerium nitrate (III) and zirconyl nitrate were mixed in a ratio of Ce/Zr=5/5 to prepare an aqueous solution (1). An aqueous solution containing polyoxyethylene polypropyl alkyl ether in 5% by weight of that of an obtained oxide and an aqueous hydrogen peroxide containing hydrogen peroxide in an equal molar number of that of cerium ion were added to the aqueous solution (1), and they were mixed and agitated to obtain an aqueous solution (2). Then, the aqueous solution (2) was neutralized by dropping an aqueous ammonia while agitating the aqueous solution (2) to obtain a precipitate.

A slurry containing the precipitate was subjected to still standing, and a supernatant was removed. The same amount of water as that of the removed water was added, and a supernatant was removed. Such treatment was performed one more. After that, a remained slurry was put into a vessel which was heated at the temperature of 250° C. to be heated until water and ammonium nitrate were vaporized or decomposed, thereby obtaining a powder containing a solid solution particle of oxides. The degree of dissolution of the solid solution particle of oxides was 95%, and an average diameter of a crystallite was 6 nm, and a specific surface area was 80 m$^2$/g.

Figure 6:
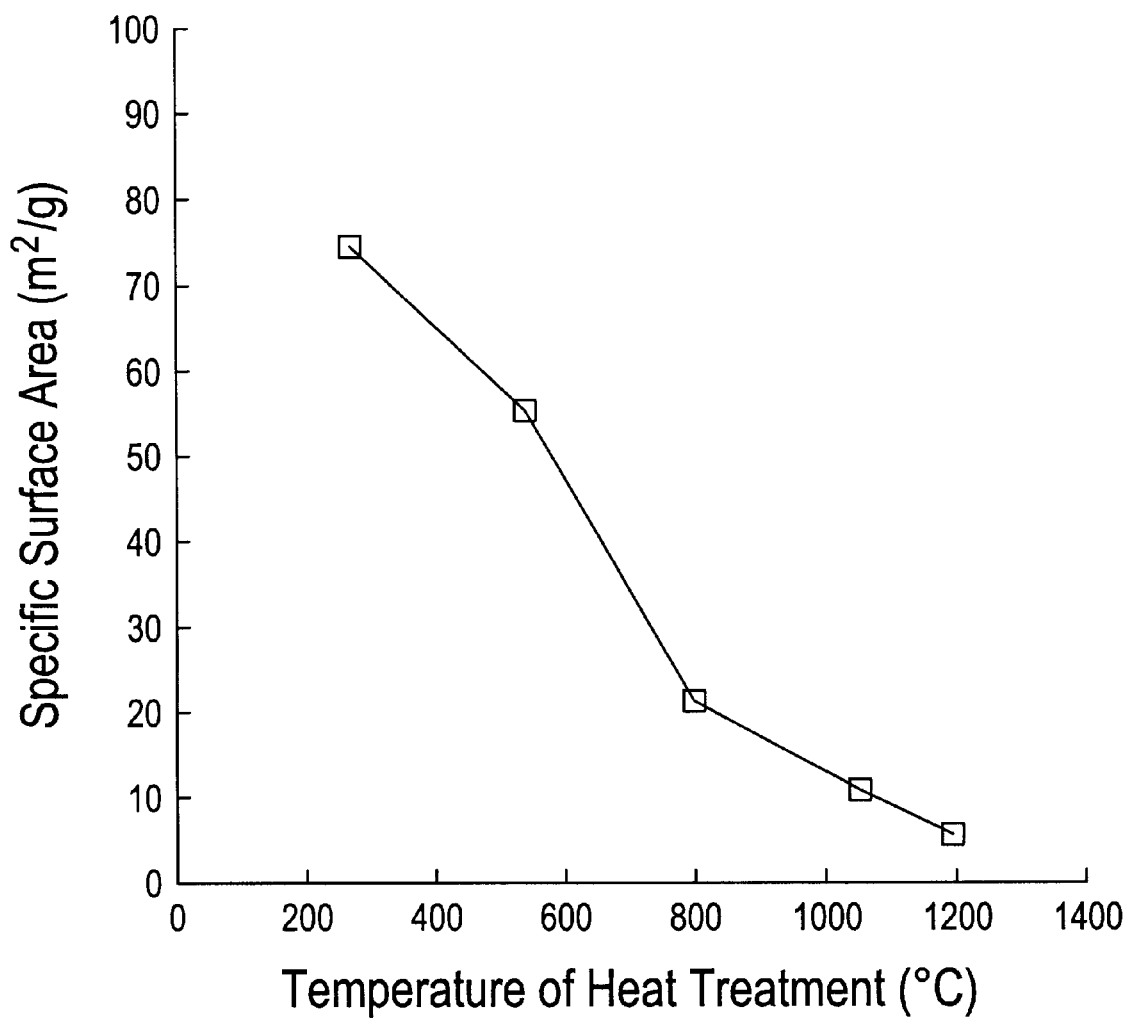
FIG. 6 is a graph for showing the relationship between the temperature of a heat treatment and a specific surface area.
Figure 7:
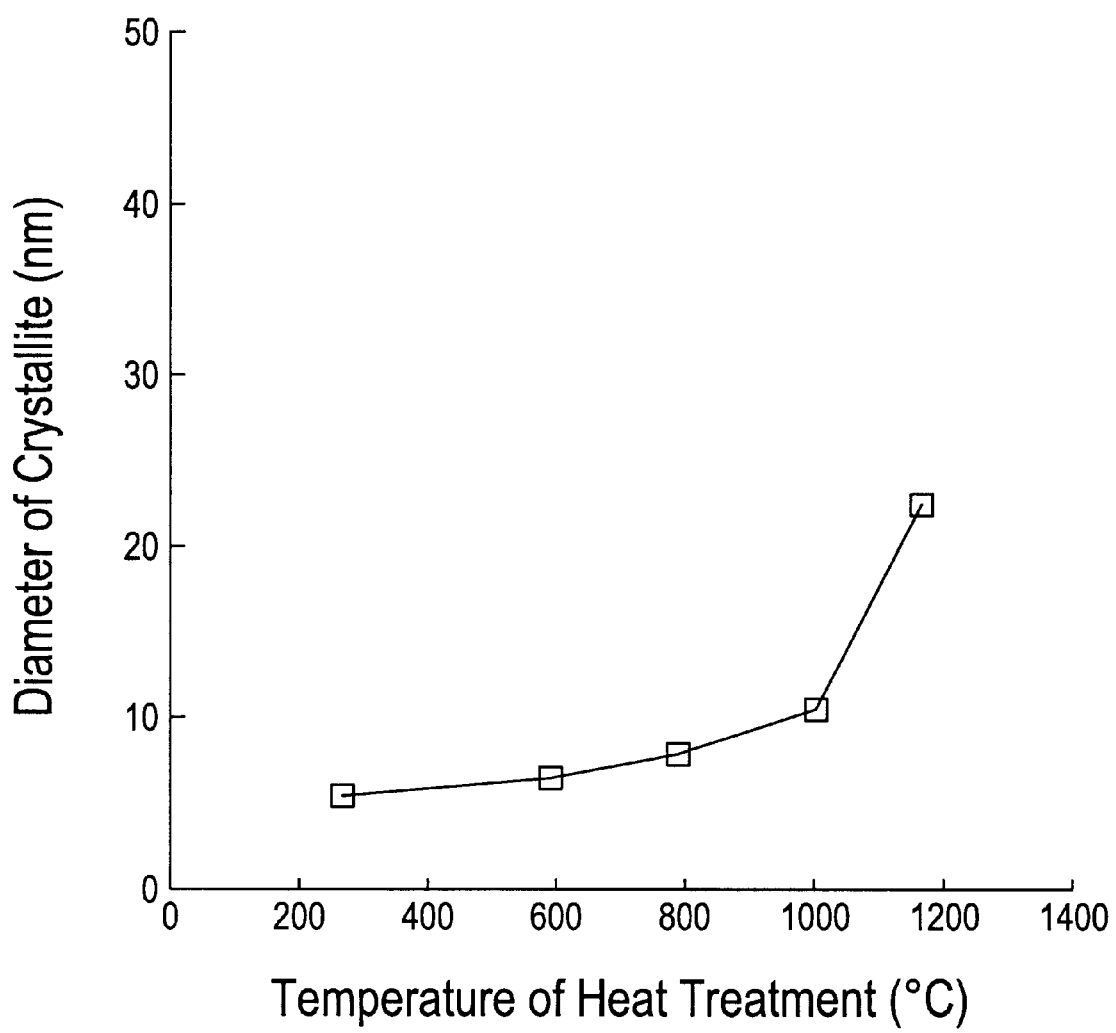
FIG. 7 is a graph for showing the relationship between the temperature of a heat treatment and an average diameter of a crystallite.

The above solid solution particle of oxides was subjected to heat treatment. After that, a specific surface area and an average diameter of a crystallite were measured. The result was shown in FIGS. 6 and 7. The heat treatment was performed at the temperature of 300, 600, 800, 1000 and 1200° C., respectively, for 5 hours.

Twentieth Preferred Embodiment

A sold solution of oxides of the twentieth preferred embodiment was prepared by subjecting the solid solution particle of oxides of the first preferred embodiment to heat treatment at the temperature of 1200° C. for 2 hours in a reducing atmosphere containing 1 volume % of carbon monoxide. The degree of dissolution of the solid solution particle of oxides which was calculated in the same manner as that of the first preferred embodiment was 100%, and an average diameter of a crystallite was 55 nm, and a specific surface area was 4 m$^2$/g. Furthermore, OSC of the particle was 800 $\mu$molO$_2$/g.

Twenty-first Preferred Embodiment

A solid solution of oxides of the twenty-first preferred embodiment was prepared by subjecting the solid solution particle of oxides of the first preferred embodiment to heat treatment at the temperature of 1100° C. for 5 hours in a reducing atmosphere containing 1 volume % of hydrogen gas. The degree of dissolution of the solid solution particle of oxides which was calculated in the same manner as that of the first preferred embodiment was 100%, and an average diameter of a crystallite was 48 nm, and a specific surface area was 8 m$^2$/g. Furthermore, OSC of the particle was 750 $\mu$molO$_2$/g.

Evaluation

According to each result of the preferred embodiments 20 and 21, when the solid solution particle of oxides of the first preferred embodiment was subjected to heat treatment in the reducing atmosphere, the average diameter came to be somewhat large, and OSC came to be remarkably large.

Twenty-second Preferred Embodiment

A solid solution of oxides of the twenty-second preferred embodiment was prepared in the same manner as that of the first preferred embodiment except that an aqueous solution in which cerium nitrate (III) and zirconyl nitrate were variously mixed in such a manner that a ratio of Ce/Zr=9/1 to 1/9. As for each solid solution particle of oxides, OSC which was calculated in the same manner as that of the first preferred embodiment was shown in FIG. 6. Furthermore, the lattice constant of crystallite of each solid solution particle of oxides was shown in FIG. 4

Evaluation

Figure 8:
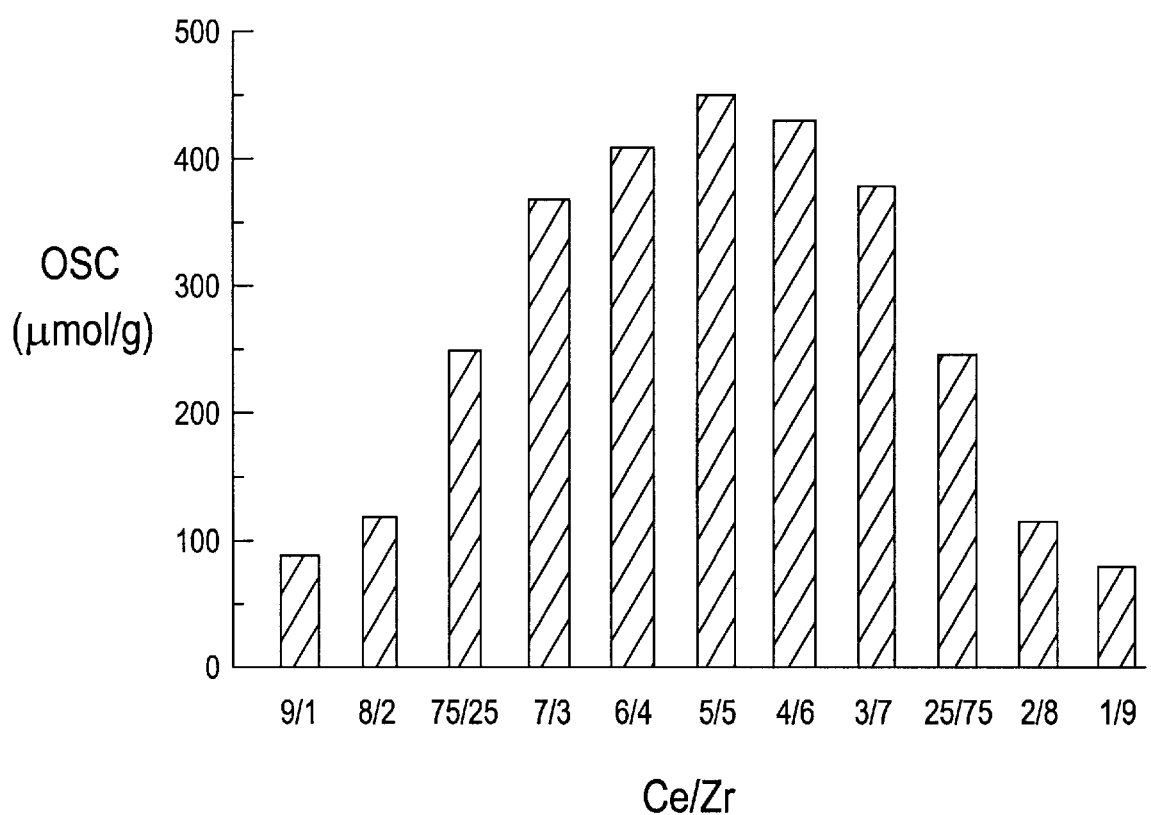
FIG. 8 is a graph for showing the relationship between a molar ratio of Ce/Zr, and OSC of a solid solution particle of oxides.

It is apparent from FIG. 8 that OSC was not less than 250 $\mu$molO$_2$/g when a ratio of Ce/Zr was 75/25 to 25/75. According to FIG. 4, the dissolution of zirconia contained in the particle into ceria was almost 100%.

Twenty-third Preferred Embodiment

A solid solution of oxides of the twenty-third preferred embodiment was prepared in the same manner as that of the first preferred embodiment except that an aqueous solution of hydrogen peroxide was not employed, and that the agitation was performed at high rate of shear of not less than 10$^4$ sec$^{-1}$ at the time of neutralization and addition of the surfactant The degree of dissolution of the solid solution particle of oxides which was calculated in the same manner as that of the first preferred embodiment was 90%, and an average diameter of a crystallite was 7 nm, and a specific surface area was 60 m$^2$/g.

Comparative Example 4

A solid solution particle of oxides of Comparative Example 4 was prepared in the same manner as that of the first preferred embodiment except that an aqueous solution of hydrogen peroxide was not employed. The degree of dissolution of the solid solution particle of oxides which was calculated in the same manner as that of the first preferred embodiment was 40%, and an average diameter of a crystallite was 6 nm, and a specific surface area was 85 m$^2$/g.

Evaluation

The solid solution particle of oxides of Comparative Example 4 showed lower degree of dissolution than that of the twenty-third preferred embodiment. However, the solid solution particle of oxides of the twenty-third preferred embodiment showed the same degree of dissolution as that of the first preferred embodiment. Namely, it is apparent that the dissolution was promoted by agitation at high rate of shear of not less than 10$^4$ sec$^{-1}$ instead of employing hydrogen peroxide.

Twenty-fourth Preferred Embodiment

Cerium nitrate (IV) and zirconyl nitrate were mixed in a ratio of Ce/Zr=5/5 to prepare an aqueous solution (1). The aqueous solution (1) was neutralized by dropping an aqueous ammonia while agitating the aqueous solution (1) to obtain a precipitate. Then, an aqueous solution containing alkyl benzene sulfonic acid in 10% by weight of that of an obtained oxide were added to the aqueous solution (1), and they were mixed and agitated to obtain a slurry.

The slurry was sprayed in an atmosphere having an introducing atmosphere temperature of 400° C. and a discharging atmosphere temperature of 250° C., and was dried by a spray-drying method. Simultaneously, coexistent ammonium nitrate was decomposed to prepare a solid solution particle of oxides. The degree of dissolution of the solid solution particle of oxides which was calculated in the same manner as that of the first preferred embodiment was 100%, and an average diameter of a crystallite was 10 nm, and a specific surface area was 50 m$^2$/g.

Evaluation

As compared with Comparative Example 2 and the twenty-fourth preferred embodiment, when cerium (IV) was employed instead of cerium (III), it is apparent that the degree of dissolution was high without employing hydrogen peroxide.

Twenty-fifth Preferred Embodiment

A solid solution of oxides of the twenty-fifth preferred embodiment was prepared in the same manner as that of the twenty-fourth preferred embodiment except that an aqueous solution of alkyl benzene sulfonic acid was previously added to an aqueous solution comprising cerium nitrate (IV) and zirconyl nitrate before dropping an aqueous ammonium. The degree of dissolution of the solid solution particle of oxides which was calculated in the same manner as that of the first preferred embodiment was 100%, and an average diameter of a crystallite was 10 nm, and a specific surface area was 40 m$^2$/g.

Evaluation

In the twenty-fifth preferred embodiment, the same solid solution of oxides as that of the twenty-fourth preferred embodiment was obtained. According to this matter, in spite of the timing of adding the surfactant, it showed the same action before and after the solution was neutralized by alkali. Namely, the action of the surfactant was effective for oxide not only when the solution was neutralized but also after the solution was neutralized.

Twenty-sixth Preferred Embodiment

A solid solution of oxides of the twenty-sixth preferred embodiment was prepared in the same manner as that of the twenty-fourth preferred embodiment except that an aqueous solution of α olefin sulfonic acid was employed instead of an aqueous solution of alkyl benzenesulfonic acid. The degree of dissolution of the solid solution particle of oxides which was calculated in the same manner as that of the first preferred embodiment was 95%, and an average diameter of a crystallite was 8 nm, and a specific surface area was 60 m$^2$/g.

Twenty-seventh Preferred Embodiment

A solid solution of oxides of the twenty-seventh preferred embodiment was prepared in the same manner as that of the twenty-fourth preferred embodiment except that an aqueous solution of polyoxyethylene polypropyl alkyl ether was employed instead of an aqueous solution of alkyl benzene sulfonic acid. The degree of dissolution of the solid solution particle of oxides which was calculated in the same manner as that of the first preferred embodiment was 100%, and an average diameter of a crystallite was 8 nm, and a specific surface area was 45 m$^2$/g.

Twenty-eighth Preferred Embodiment

A solid solution of oxides of the twenty-eighth preferred embodiment was prepared in the same manner as that of the twenty-fourth preferred embodiment except that an aqueous solution of cetyl trimethyl ammonium chloride was employed instead of an aqueous solution of alkyl benzene sulfonic acid. The degree of dissolution of the solid solution particle of oxides which was calculated in the same manner as that of the first preferred embodiment was 95%, and an average diameter of a crystallite was 7 nm, and a specific surface area was 62 m$^2$/g.

Twenty-ninth Preferred Embodiment

A solid solution of oxides of the twenty-ninth preferred embodiment was prepared in the same manner as that of the twenty-fourth preferred embodiment except that an aqueous solution of monoalkyl ammonium acetate was employed instead of an aqueous solution of alkyl benzene sulfonic acid. The degree of dissolution of the solid solution particle of oxides which was calculated in the same manner as that of the first preferred embodiment was 90%, and an average diameter of a crystallite was 8 nm, and a specific surface area was 60 m$^2$/g.

Thirtieth Preferred Embodiment

A solid solution of oxides of the thirtieth preferred embodiment was prepared in the same manner as that of the twenty-fourth preferred embodiment except that an aqueous solution of polyoxyethylene alkyl phenyl ether was employed instead of an aqueous solution of alkyl benzene sulfonic acid. The degree of dissolution of the solid solution particle of oxides which was calculated in the same manner as that of the first preferred embodiment was 95%, and an average diameter of a crystallite was 8 nm, and a specific surface area was 55 m$^2$/g.

Thirty-first Preferred Embodiment

A solid solution of oxides of the thirty-first preferred embodiment was prepared in the same manner as that of the twenty-fourth preferred embodiment except that an aqueous solution of polyoxyethylene alkyl ether was employed instead of an aqueous solution of alkyl benzenesulfonic acid. The degree of dissolution of the solid solution particle of oxides which was calculated in the same manner as that of the first preferred embodiment was 95%, and an average diameter of a crystallite was 8 nm, and a specific surface area was 57 m$^2$/g.

Thirty-second Preferred Embodiment

A solid solution of oxides of the thirty-second preferred embodiment was prepared in the same manner as that of the twenty-fourth preferred embodiment except that an aqueous solution of polyoxyethylene alkyl amine was employed instead of an aqueous solution of alkyl benzene sulfonic acid. The degree of dissolution of the solid solution particle of oxides which was calculated in the same manner as that of the first preferred embodiment was 90%, and an average diameter of a crystallite was 6 nm, and a specific surface area was 45 m$^2$/g.

Thirty-third Preferred Embodiment

A solid solution of oxides of the thirty-third preferred embodiment was prepared in the same manner as that of the twenty-fourth preferred embodiment except that an aqueous solution of polyoxyethylene fatty acid amide was employed instead of an aqueous solution of alkyl benzene sulfonic acid. The degree of dissolution of the solid solution particle of oxides which was calculated in the same manner as that of the first preferred embodiment was 90%, and an average diameter of a crystallite was 7 nm, and a specific surface area was 59 m$^2$/g.

Thirty-fourth Preferred Embodiment

A solid solution of oxides of the thirty-fourth preferred embodiment was prepared in the same manner as that of the twenty-fourth preferred embodiment except that an aqueous solution of trialkylamine oxide was employed instead of an aqueous solution of alkyl benzene sulfonic acid. The degree of dissolution of the solid solution particle of oxides which was calculated in the same manner as that of the first preferred embodiment was 95%, and an average diameter of a crystallite was 9 nm, and a specific surface area was 62 m$^2$/g.

Thirty-fifth Preferred Embodiment

A solid solution of oxides of the thirty-fifth preferred embodiment was prepared in the same manner as that of the twenty-fourth preferred embodiment except that an aqueous solution of polyoxyethylene alkyl methyl ammonium chloride was employed instead of an aqueous solution of alkyl benzene sulfonic acid. The degree of dissolution of the solid solution particle of oxides which was calculated in the same manner as that of the first preferred embodiment was 100%, and an average diameter of a crystallite was 9 nm, and a specific surface area was 30 m$^2$/g.

Thirty-sixth Preferred Embodiment

A solid solution of oxides of the thirty-sixth preferred embodiment was prepared in the same manner as that of the twenty-fourth preferred embodiment except that an aqueous solution of beef tallow diamine dioleic acid was employed instead of an aqueous solution of alkyl benzene sulfonic acid. The degree of dissolution of the solid solution particle of oxides which was calculated in the same manner as that of the first preferred embodiment was 100%, and an average diameter of a crystallite was 8 nm, and a specific surface area was 40 m$^2$/g.

Evaluation

According to each result of the preferred embodiments 24 and 26 to 36, even if hydrogen peroxide was not employed, all surfactants employed in these embodiments exhibited the same effect as that of alkyl benzene sulfonic acid.

Thirty-seventh Preferred Embodiment

A solid solution of oxides of the thirty-seventh preferred embodiment was prepared in the same manner as that of the twenty-fourth preferred embodiment except that, after water was squeezed by the filter press, the slurry containing precipitate was heated and dried at the temperature of 300° C., and that it was mechanically pulverized. The degree of dissolution of the solid solution particle of oxides which was calculated in the same manner as that of the first preferred embodiment was 95%, and an average diameter of a crystallite was 8 nm, and a specific surface area was 70 m$^2$/g.

Thirty-eighth at Preferred Embodiment

A solid solution of oxides of the thirty-eighth preferred embodiment was prepared in the same manner as that of the twenty-fourth preferred embodiment except that the slurry containing precipitate was brought into contact with a ceramic ball which was heated at the temperature of 250° to be dried, and that it was mechanically pulverized by the ball. The degree of dissolution of the solid solution particle of oxides which was calculated in the same manner as that of the first preferred embodiment was 100%, and an average diameter of a crystallite was 8 nm, and a specific surface area was 40 m$^2$/g.

Thirty-ninth Preferred Embodiment

A solid solution of oxides of the thirty-ninth preferred embodiment was prepared in the same manner as that of the twenty-fourth preferred embodiment except that the slurry containing precipitate was put into a vessel which was heated at the temperature of 300° C. to be heated until water and ammonium nitrate were vaporized or decomposed, and that it was mechanically pulverized. The degree of dissolution of the solid solution particle of oxides which was calculated in the same manner as that of the first preferred embodiment was 100%, and an average diameter of a crystallite was 9 nm, and a specific surface area was 35 m$^2$/g.

Evaluation

According to each result of the preferred embodiments 24 and 37 to 39, even if hydrogen peroxide was not employed, there was no difference caused by the above employed pulverizing method.

Fortieth Preferred Embodiment

A solid solution of oxides of the fortieth preferred embodiment was prepared by subjecting the solid solution particle of oxides of the twenty-fourth preferred embodiment to heat treatment at the temperature of 1200° C. for 2 hours in a reducing atmosphere containing 1 volume % of carbon monoxide. The degree of dissolution of the solid solution particle of oxides which was calculated in the same manner as that of the first preferred embodiment was 100%, and an average diameter of a crystallite was 52 nm, and a specific surface area was 5 m$^2$/g.

Forty-first Preferred Embodiment

A solid solution of oxides of the forty-first preferred embodiment was prepared by subjecting the solid solution particle of oxides of the twenty-fourth preferred embodiment to heat treatment at the temperature of 1100° C. for 5 hours in a reducing atmosphere containing 1 volume % of hydrogen gas. The degree of dissolution of the solid solution particle of oxides which was calculated in the same manner as that of the first preferred embodiment was 100%, and an average diameter of a crystallite was 44 nm, and a specific surface area was 9 m$^2$/g.

Evaluation

According to each result of the preferred embodiments 40 and 41, when the solid solution particle of oxides of the twenty-third preferred embodiment was subjected to heat treatment in the reducing atmosphere, the average diameter came to be somewhat large, and OSC came to be remarkably large.

Forty-second Preferred Embodiment

Each solid solution of oxides of the forty-second preferred embodiment was prepared in the same manner as that of the twenty-fourth preferred embodiment except that an additional amount of an aqueous solution containing alkyl benzene sulfonic acid was variously selected. As for each solid solution particle of oxides, the lattice constant of crystallite was the same as that of FIG. 3. As for cerium (IV), without employing hydrogen peroxide, it is apparent that the degree of dissolution of zirconia is high.

Forty-third Preferred Embodiment

Figure 9:
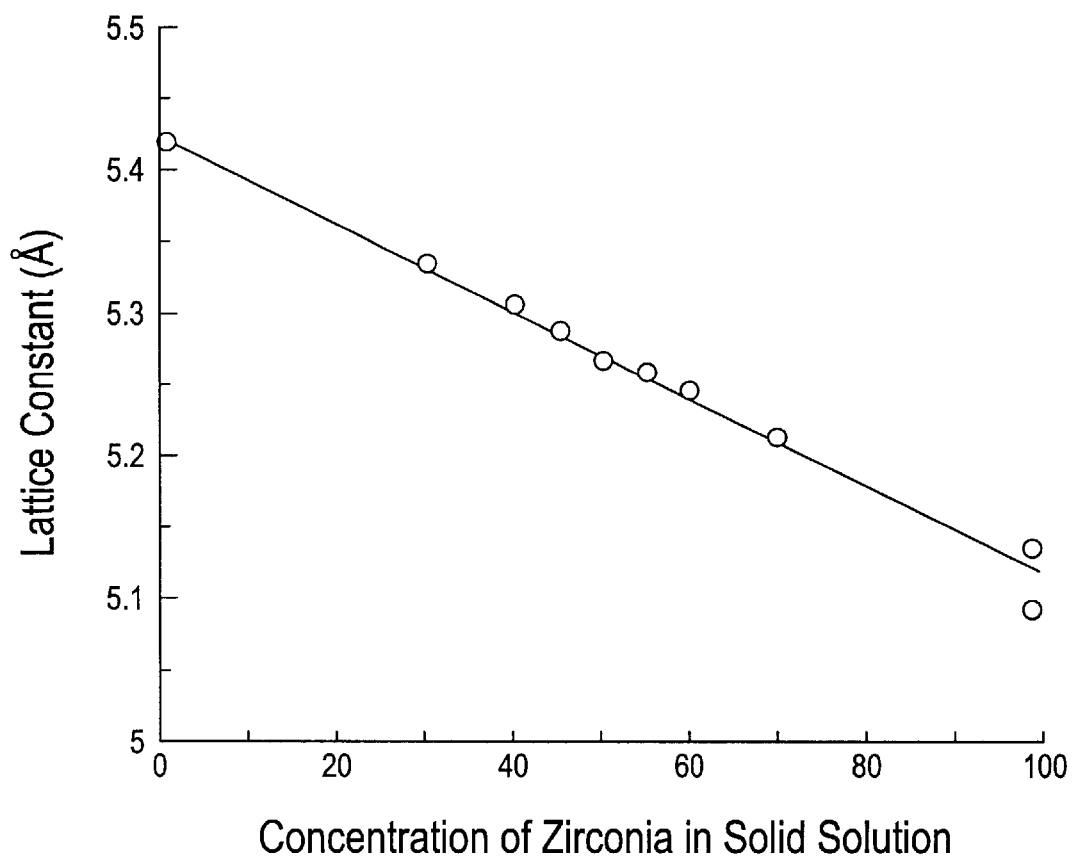
FIG. 9 is a graph for showing the relationship between a concentration of zirconia in a solid solution particle of oxides and a lattice constant.

A solid solution of oxides of the forty-third preferred embodiment was prepared in the same manner as that of the first preferred embodiment except that an aqueous solution in which cerium nitrate (IV) and zirconyl nitrate were variously mixed in such a manner that a ratio of Ce/Zr=9/1 to 1/9. As for each solid solution particle of oxides, OSC was the same as that of FIG. 8, and the lattice constant of crystallite was the same as that of FIG. 9.

When cerium (IV) was employed, without employing hydrogen peroxide, it is apparent that OSC was not less than 250 $\mu$molO$^2$/g when a ratio of Ce/Zr was 75/25 to 25/75. Furthermore, even if hydrogen peroxide was not employed, a skeleton of zirconia was formed in the crystallite of ceria due to dissolution of zirconia.

Forty-fourth Preferred Embodiment

Cerium nitrate (III) and zirconyl nitrate were mixed in a ratio of Ce/Zr=5/5 to prepare an aqueous solution. The aqueous solution was neutralized by dropping an aqueous ammonia while agitating the aqueous solution to obtain a precipitate as a slurry. The slurry was dried in the same manner as that of the fast preferred embodiment, and it was further subjected to heat treatment in the same manner as that of the nineteenth preferred embodiment. The degree of dissolution of the solid solution particle of oxides was 80%, and an average diameter of a crystallite was 48 nm, and a specific surface area was 3 m$^2$/g.

Forty-fifth Preferred Embodiment

Cerium nitrate (III) and zirconyl nitrate were mixed in a ratio of Ce/Zr=5/5 to prepare an aqueous solution. The aqueous solution was neutralized by dropping an aqueous ammonia while agitating the aqueous solution to obtain a precipitate as a slurry. The slurry was dried in the same manner as that of the first preferred embodiment, and it was further subjected to heat treatment in the same manner as that of the twenty-first preferred embodiment. The degree of dissolution of the solid solution particle of oxides was 70%, and an average diameter of a crystallite was 40 nm, and a specific surface area was 9 m$^2$/g.

Forty-sixth Preferred Embodiment

Cerium nitrate (III) and zirconyl nitrate were mixed in a ratio of Ce/Zr=5/5 to prepare an aqueous solution (1). Then, an aqueous solution of yttrium nitrate was added in such a manner that a molar ratio of Y/(Y+Ce+Zr)=0/100–10/10 at five different levels. Further, hydrogen peroxide in one second molar number of that of cerium ion contained in the aqueous solution (1) and polyoxyethylene polypropyl alkyl ether in 5% by weight of that of an obtained oxide were added to prepare an aqueous solution (2). After that, the aqueous solution (2) was neutralized by dropping an aqueous ammonia while agitating the aqueous solution (2) to obtain each precipitate. Each precipitate was put into an oven which was heated at the temperature of 300° C. to vaporize moisture, and each precipitate was heated until ammonium nitrate and the surfactant were vaporized or decomposed to obtain each solid solution particle of oxides. As for each solid solution particle of oxides, an average diameter of a crystallite was 8 nm, and a specific surface area was 70 m$^2$/g.

Figure 10:
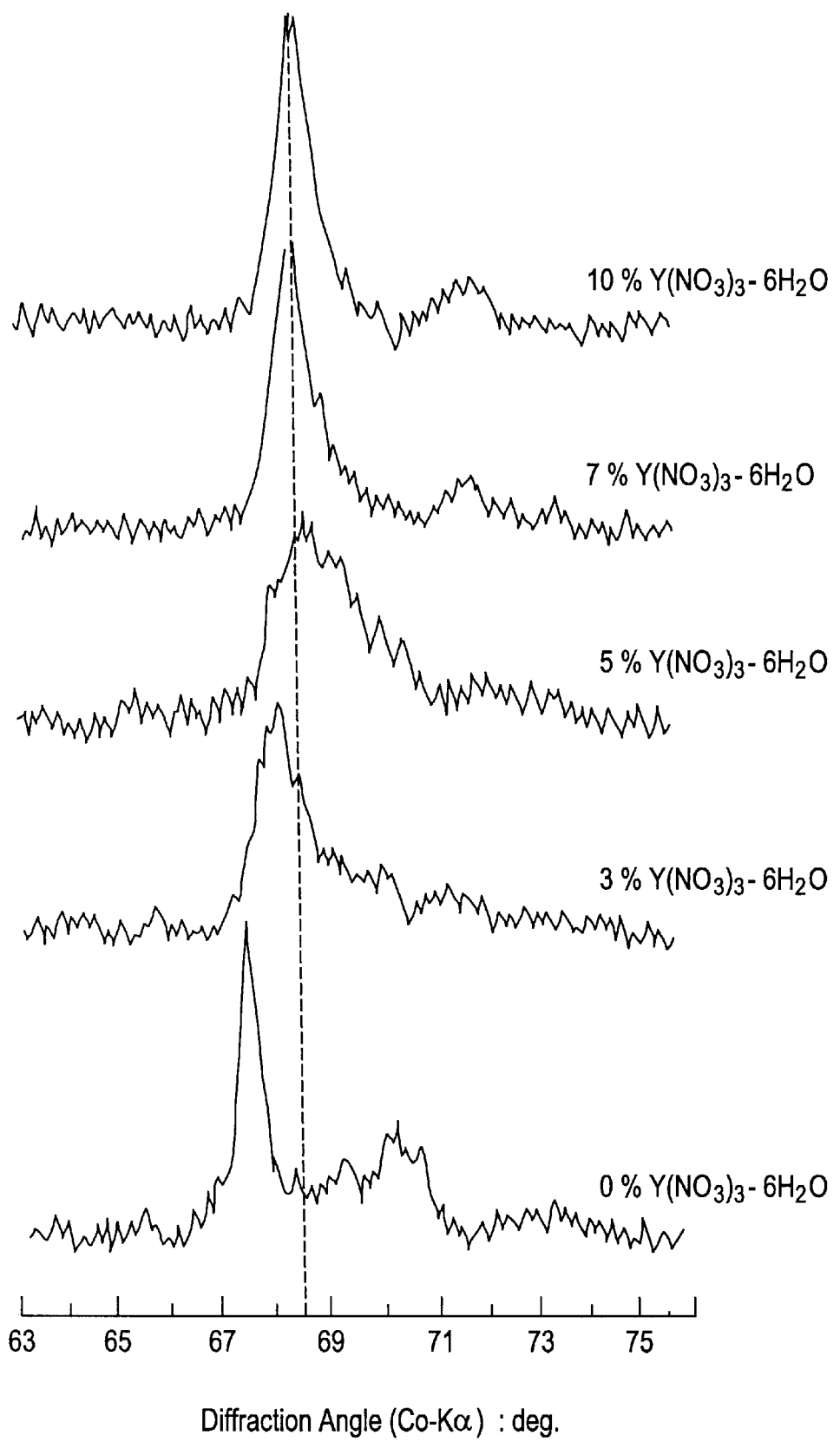
FIG. 10 is an X-ray diffraction chart for showing an effect of an additional amount of yttrium.

Each solid solution particle of oxides was heated in the atmosphere having the temperature of 1200° C. for 4 hours, and the change in a crystallite phase was respectively examined by an X-ray diffraction. The result was shown in FIG. 10. According to FIG. 10, it is apparent that a solid solution phase came to be further stable due to the addition of yttrium.

Forty-seventh Preferred Embodiment

Each solid solution particle of oxides of the forty-seventh preferred embodiment was prepared in the same manner as that of the forty-sixth preferred embodiment except that calcium nitrate was employed instead of yttrium nitrate. As for each solid solution particle of oxides, an average diameter of a crystallite was 7 nm, and a specific surface area was 80 $m^2/g$.

Figure 11:
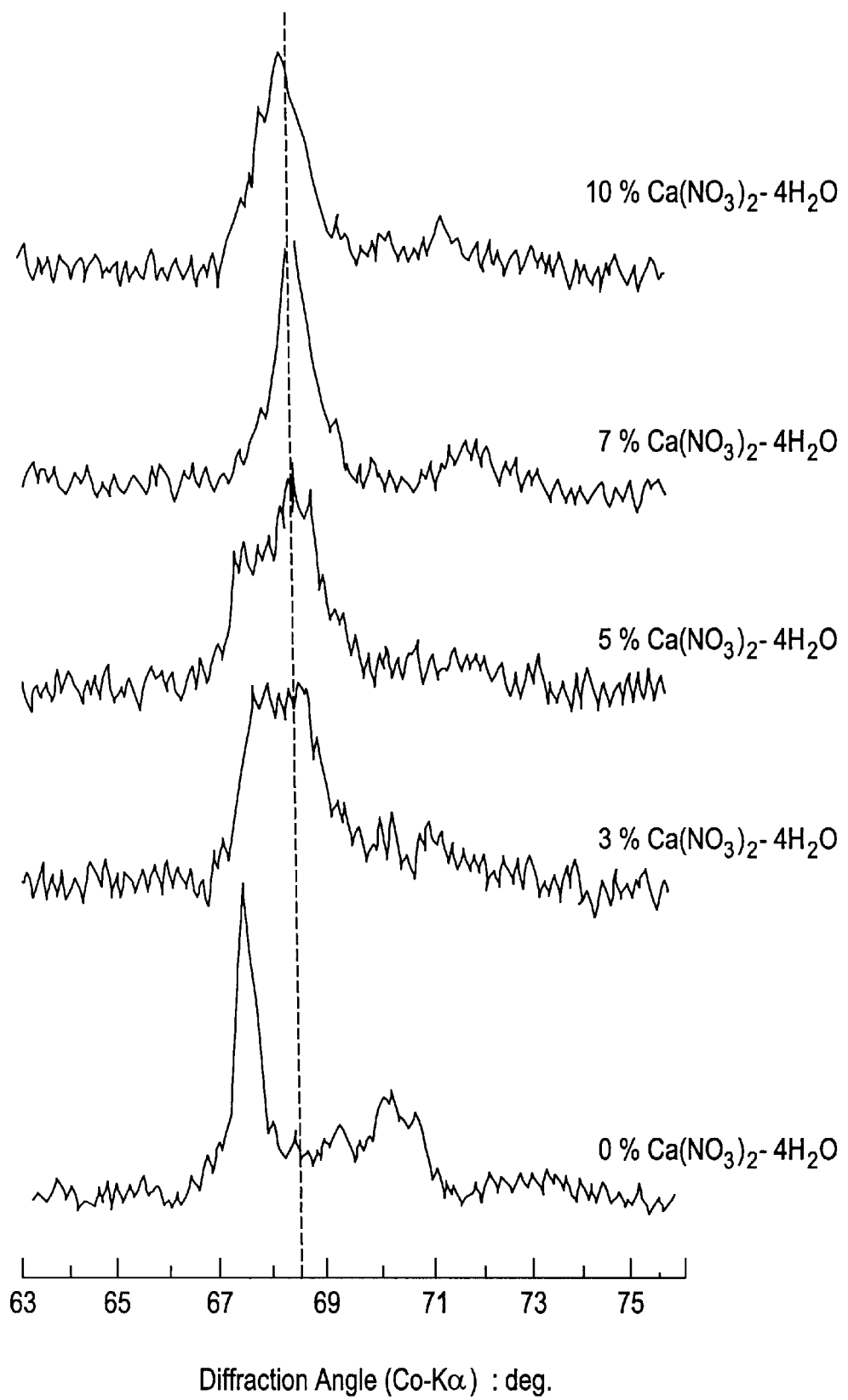
FIG. 11 is an X-ray diffraction chart for showing an effect of an additional amount of calcium.

Each solid solution particle of oxides was heated in the atmosphere having the temperature of 1200° C. for 4 hours, and the change in a crystallite phase was respectively examined by an X-ray diffraction. The result was shown in FIG. 11. According to FIG. 11, it is apparent that a solid solution phase came to be further stable due to the addition of calcium.

Forty-eighth Preferred Embodiment

Each solid solution particle of oxides of the forty-eighth preferred embodiment was prepared in the same manner as that of the forty-sixth preferred embodiment except that lanthanum nitrate, magnesium nitrate, strontium nitrate and barium nitrate were employed, in a ratio of M/(M+Ce+Zr)= 7/100, 10/100, 10/100 and 10/100 respectively, instead of yttrium nitrate. As for each solid solution particle of oxides, an average diameter of a crystallite was 6–8 nm, and a specific surface area was 60–90 $m^2/g$.

Figure 12:
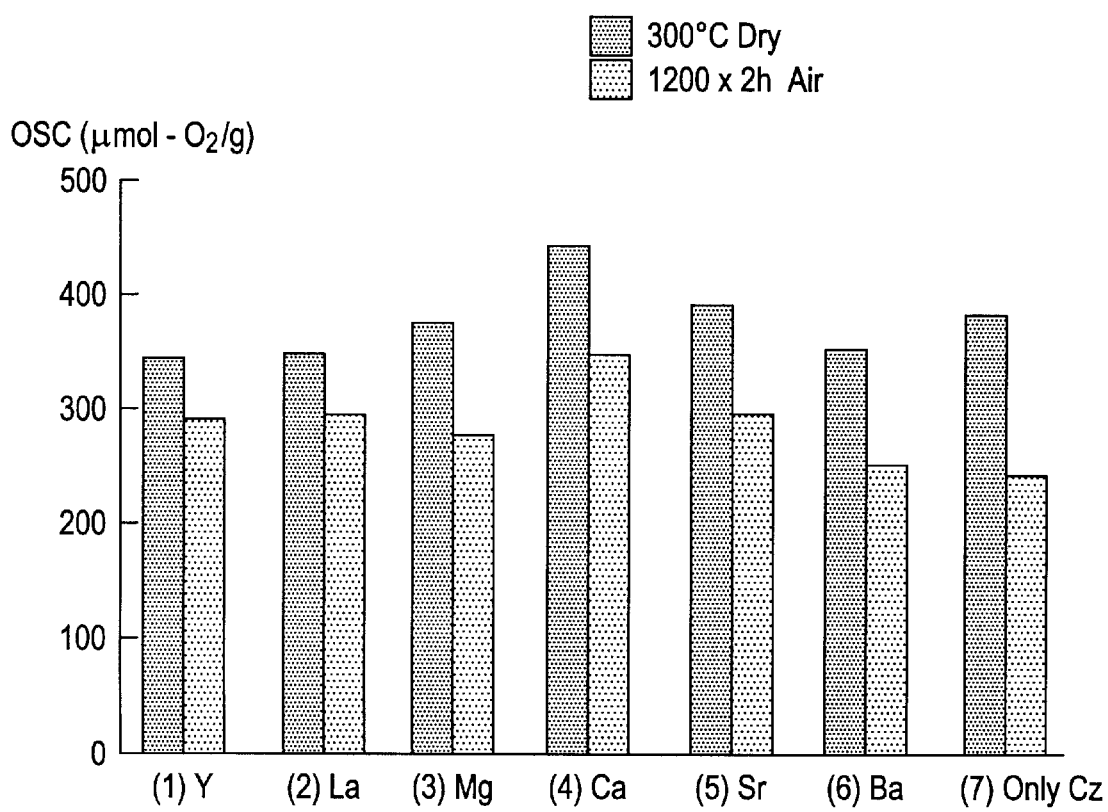
FIG. 12 is a graph for showing OSC when an alkaline-earth element or a rare-earth element is added.

Each solid solution particle of oxides in the preferred embodiments 1 and 46 to 48 was heated in the atmosphere having the temperature of 300° C. or 1200° C. for 2 hours, and each OSC was measured in the same manner as that of the first preferred embodiment. The result together with the result of the first preferred embodiment was shown in FIG. 12. According to FIG. 12, it is apparent that each solid solution particle of oxides of the preferred embodiments 46 to 48 exhibited large OSC, which was the same as that of the first preferred embodiment. Furthermore, it is also apparent that durability in high temperature was further excellent as compared with the first preferred embodiment.

Figure 13:
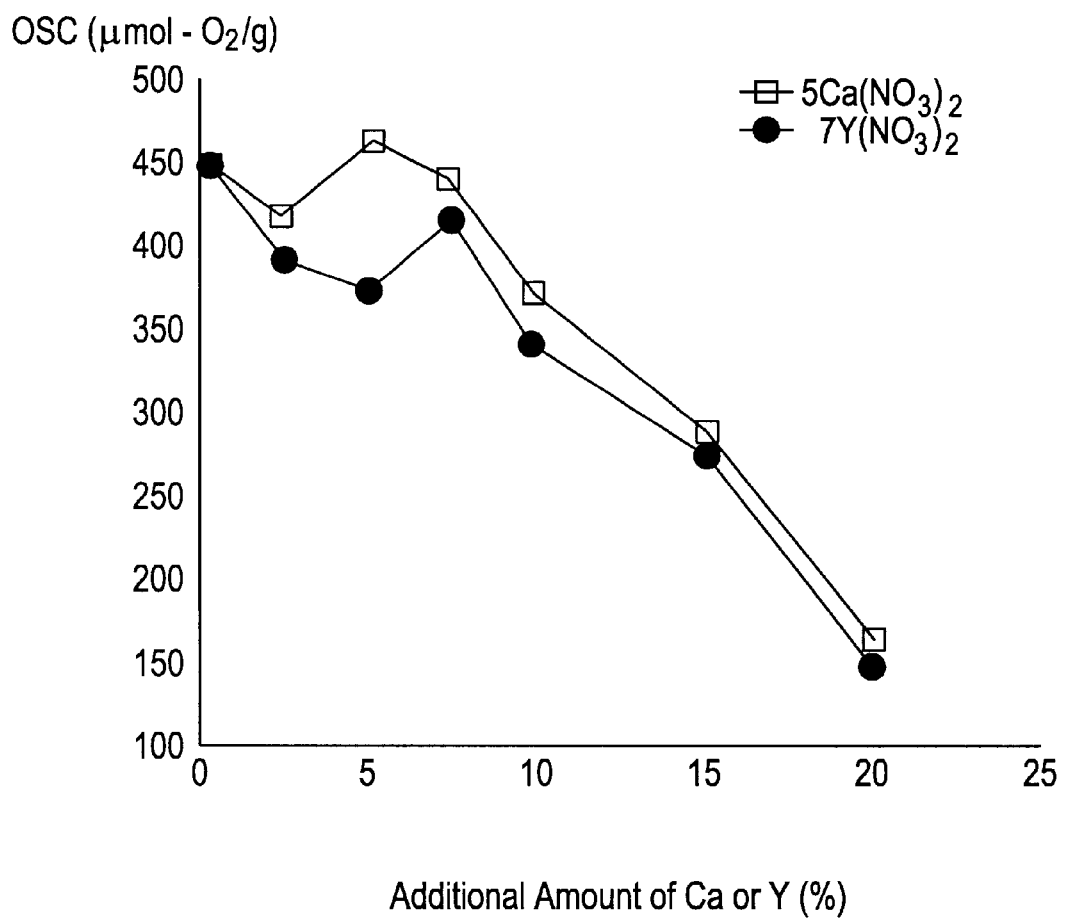
FIG. 13 is a graph for showing the relationship between an additional amount of yttrium or calcium and OSC.

As for the preferred embodiments 46 and 48, as shown in FIG. 13, as the amount of yttrium and calcium increases, OSC came to be degraded. Namely, when the amount of yttrium and calcium was not more than 15%, OSC was kept relatively large. However, when the amount of yttrium and calcium was more than 15%, OSC was decreased.

Forty-ninth Preferred Embodiment

Figure 14:
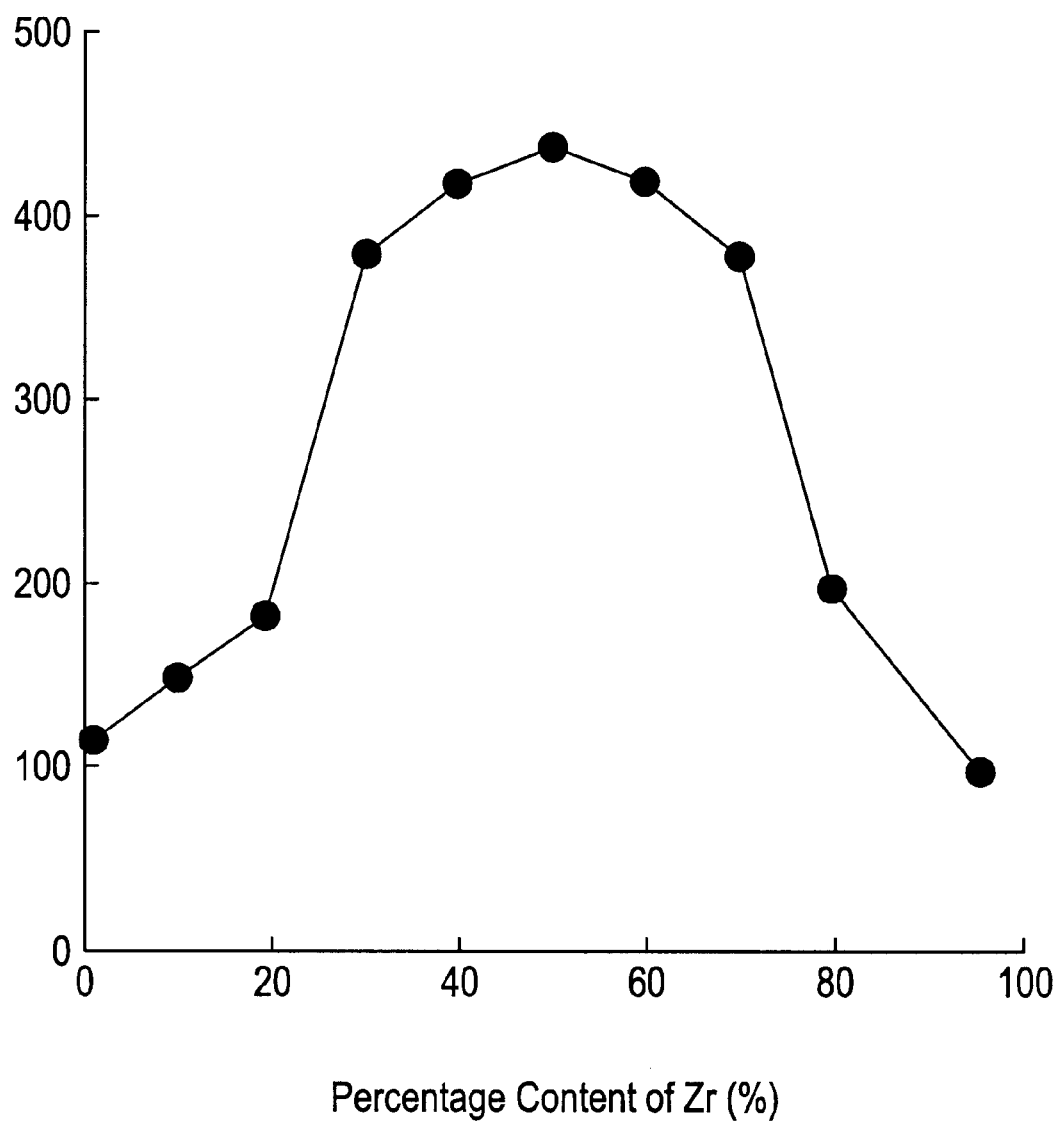
FIG. 14 is a graph for showing the relationship between a content amount of zirconium and OSC.

Each solid solution particle of oxides of the forty-ninth preferred embodiment was prepared in the same manner as that of the forth-seventh preferred embodiment except that a ratio of cerium nitrate and zirconyl nitrate was changed. Then, each OSC was measured in the same manner as that of the first preferred embodiment. The result was shown in FIG. 14. According to FIG. 14, when a ratio of Ce/Zr was not more than 25/75 or not less than 75/25, it is apparent that OSC of the solid solution of oxides was small.

Fiftieth Preferred Embodiment

A solid solution particle of oxides of the fiftieth preferred embodiment was prepared in the same manner as that of the first preferred embodiment except that an additional amount of hydrogen peroxide was 1.2 times as that of cerium ion. The degree of dissolution of the solid solution particle of oxides was 100%, and an average diameter of a crystallite was 9 nm, and a specific surface area was 50 $m^2/g$.

Thus, it is possible to prepare the solid solution particle of oxides having the same degree of dissolution as that of the first preferred embodiment even if more amount of hydrogen peroxide than that of the first preferred embodiment was added.

Fifty-first Preferred Embodiment

Cerium nitrate (III) and zirconyl nitrate were mixed in a ratio of Ce/Zr=5/5 to prepare an aqueous solution (1). The aqueous solution (1) was neutralized by dropping an aqueous ammonia while agitating the aqueous solution (1) to obtain a precipitate. Then, an aqueous hydrogen peroxide containing hydrogen peroxide in one second molar number of that of cerium ion contained in the aqueous solution (1) and an aqueous solution containing alkyl benzene sulfonic acid in 10% by weight of that of an obtained oxide were added to the aqueous solution (1), and they were mixed and agitated to obtain a slurry.

The slurry was sprayed in an atmosphere having an introducing atmosphere temperature of 400° C. and a discharging atmosphere temperature of 250° C., and was dried by a spray-drying method. Simultaneously, coexistent ammonium nitrate was vaporized or decomposed to prepare a powder containing a solid solution particle of oxides. When the degree of dissolution of the solid solution particle of oxides was calculated by the formula (3) based on a lattice constant defined by an X-ray diffraction, the degree of dissolution was 100%. When an average diameter of a crystallite was calculated by the formula of Scherrer based on 311 peak of an X-ray diffraction pattern, the average diameter was 10 nm. Furthermore, a specific surface area of the solid solution particle of oxides calculated by a BET method was 45 $m^2/g$.

500 g of the obtained solid solution powder, 1000 g of a powder of γ-alumina (having a specific surface area of 140 $g/m^2$ in the BET method) which was thermally stabilized by adding 5% by weight of La, 100 g of boehmite and 100 g of an aqueous solution of 10% of nitric acid were agitated and mixed in an alumina ball mill for 1 hour to prepare a slurry. 1.7 liter of a cordierite honeycomb support base material was impregnated into the slurry and it was picked up to blow off an extra slurry. After that, the obtained substance was subjected to heat treatment at the temperature of 600° C. for 2 hours to form a honeycomb support having a loaded layer containing a promoter. An amount of slurry adhered was 250 g in drying condition.

Subsequently, the obtained honeycomb support was impregnated into an aqueous solution of dinitro diamine platinum, and it was picked up to blow off an extra moisture. After that, the obtained substance was dried at the temperature of 250° C. for 2 hours. Then, the dried substance was impregnated into an aqueous solution of rhodium nitrate, and it was picked up to blow off an extra moisture. After that, the obtained substance was dried at the temperature of 250° C. for 2 hours. Finally, Pt and Rh were loaded to form a catalyst for purifying exhaust gases in the present invention. A loading amount of Pt and Rh was respectively 1 g and 0.2 g with respect to 1 liter of the honeycomb support.

Comparative Example 5

A catalyst for purifying exhaust gases of Comparative Example 5 was prepared in the same manner as that of the fifty-first preferred embodiment except that cerium nitrate (III) and zirconyl nitrate were mixed in a ratio of Ce/Zr=8/2, and that the surfactant was not employed. The degree of dissolution of the obtained solid solution particle was 38%, and an average particle diameter was 7 nm, and a specific surface area in the BET method was 70 m$^2$/g.

Test & Evaluation

As for each of obtained solid solution particle of oxides in the preferred embodiment 51 and Comparative Example 5, each OSC was measured. OSC was measured as follows. Hydrogen and oxygen were alternatively communicated with each other by an apparatus for thermogravimetry, and the sample was repeatedly oxidized and reduced. At this time, change in weight was measured. As a result, OSC of the solid solution particle of oxides of the fifty-first preferred embodiment was 450 $\mu$molO$_2$/g while OSC of the solid solution particle of oxides of Comparative Example 5 was relatively small, namely, 150 $\mu$molO$_2$/g. This was caused by the difference in the degree of dissolution.

The above two kinds of catalysts for purifying exhaust gases are respectively mounted on an exhaust system, and an endurance test was performed in the condition that an inlet gas temperature was 850° C. for 50 hours. Furthermore, as for each catalyst, by employing the same engine as that of the endurance test, HC, CO and NOx purifying rate were measured in the condition that A/F=14.6, and that an inlet gas temperature was 400° C. The result was shown in Table 1.

TABLE 1

|  | HC | CO | NOx |
|---|---|---|---|
| Preferred Embodiment 51 | 92% | 90% | 90% |
| Comparative Example 5 | 87% | 82% | 80% |

According to Table 1, as compared with the catalyst for purifying exhaust gases in Comparative Example 5, the catalyst for purifying exhaust gases in the fifty-first preferred embodiment exhibited higher purifying rate, and the purifying performance after the endurance test was excellent. This was apparently caused by the difference in the degree of dissolution of the promotor and in the diameter of the particle.

Fifty-second Preferred Embodiment

A catalyst for purifying exhaust gases was prepared in the same manner as that of the fifty-first preferred embodiment except that only the solid solution powder in the fifty-first preferred embodiment was changed into a slurry, and that it was adhered to a honeycomb support to form a loaded layer.

As for the obtained catalyst, HC, CO and NOx purifying rate were measured in the same manner as that of the fifty-first preferred embodiment. As a result, the same purifying performance as that of the fifty-first preferred embodiment was obtained.

What is claimed is:

1. A solid solution particle of oxides comprising:
   crystallites having an average diameter of not more than 100 nm, said crystallites comprising:
      a first oxide; and
      a second oxide dissolved into the first oxide having a dissolution degree to the first oxide of not less than 50%.

2. A solid solution particle of oxides according to claim 1, wherein said particle aggregates to a powder.

3. A solid solution particle of oxides according to claim 1, wherein said particle has a specific surface area of not less than 1 m$^2$/g.

4. A solid solution particle of oxides comprising:
   crystallites having an average diameter of not more than 10 nm, said crystallites comprising:
      ceria; and
      zirconia dissolved into the ceria having a dissolution degree to the ceria of not less than 50%.

5. A solid solution particle of oxides according to claim 4, wherein a ratio of the number of cerium atoms to the number of zirconium atoms in said particle is 0.25≦Zr/(Ce+Zr)≦0.75.

6. A solid solution particle of oxides according to claim 4, wherein said crystallites have an average diameter of not more than 10 nm.

7. A solid solution particle of oxides comprising crystallites, said crystallites comprising:
   ceria;
   zirconia dissolved into said ceria; and
   at least one oxide of one element selected from the group consisting of alkaline-earth elements and rare-elements except cerium, said oxide being dissolved into said ceria;
   wherein the zirconia and the at least one oxide each have a dissolution degree to said ceria of not less than 50%.

8. A solid solution particle of oxides according to claim 7, a ratio of the number of atoms of said one element to the number of cerium and zirconium atoms in said ceria and the zirconia is 0<M/(Ce+Zr+M)≦0.15 wherein M is said at least one oxide.

9. A solid solution particle of oxides according to claim 7, wherein said crystallites have an average diameter of not more than 10 nm.

10. A process for producing a solid solution particle of oxides comprising:
   a first step of obtaining a precipitate by adding a surfactant and an alkaline substance to an aqueous solution of a plurality of elements to be oxides, and
   a second step of obtaining a solid solution particle of oxides, by heating said precipitate, said solid solution particle of oxides comprising crystallites having an average diameter of not more than 100 nm, said crystallites comprising:
      a first oxide; and
      a second oxide dissolved into the first oxide having a dissolution degree to the first oxide of not less than 50%.

11. A process according to claim 10, wherein said elements are cerium (IV) and zirconium.

12. A process for producing a solid solution particle of oxides comprising:
   a first step of obtaining a precipitate by adding a hydrogen peroxide, a surfactant and an alkaline substance to an aqueous solution of cerium (III) and zirconium, and
   a second step of obtaining a solid solution particle of oxides, by heating said precipitate, said solid solution particles of oxides comprising crystallites having an average diameter of not more than 100 nm, said crystallites comprising:
      ceria; and
      zirconia dissolved into the ceria having a dissolution degree to the ceria of not less than 50%.

13. A process according to claim 10, wherein a critical micelle concentration of said surfactant is not more than 0.1 mol/liter.

14. A process according to claim 11, wherein a critical micelle concentration of said surfactant is not more than 0.1 mol/liter.

15. A process according to claim 12, wherein a critical micelle concentration of said surfactant is not more than 0.1 mol/liter.

16. A process for producing a solid solution particle of oxides comprising:
a first step of obtaining a precipitate by adding an alkaline substance to an aqueous solution in which plural kinds of elements as oxide are dissolved while the aqueous solution is subjected to a high-speed agitation at high rate of shear of not less than $10^3$ sec$^{-1}$, and
a second step of obtaining a solid solution particle of oxides, by heating said precipitate, said solid solution particle of oxides comprising crystallites having an average diameter of not more than 100 nm, said crystallites comprising:
a first oxide; and
a second oxide dissolved into the first oxide having a dissolution degree to the first oxide of not less than 50%.

17. A process for producing a solid solution particle of oxides comprising:
a first step of obtaining a precipitate by adding an alkaline substance to an aqueous solution in which plural kinds of elements as oxide are dissolved, and
a second step of obtaining a solid solution particle of oxides, by heating said precipitate in a reducing atmosphere, said solid solution particles of oxides comprising crystallites having an average diameter of not more than 100 nm, said crystallites comprising:
a first oxide; and
a second oxide dissolved into the first oxide having a dissolution degree to the first oxide of not less than 50%.

18. A catalyst for purifying exhaust gases comprising:
a support comprising a particle containing a solid solution of oxides comprising crystallites having an average diameter of not more than 100 nm, said crystallites comprising:
ceria;
zirconia dissolved into the ceria having a dissolution degree to the ceria of not less than 50%; and
a noble metal loaded on said support.

19. A catalyst according to claim 18, wherein a specific surface area of said particle is not less than 5 m$^2$/g.

20. A catalyst according to claim 18, wherein said crystallites have an average diameter of not more than 50 nm.

21. A catalyst for purifying exhaust gases comprising:
a promotor comprising a particle containing a solid solution of oxides comprising crystallites having an average diameter of not more than 100 nm, said crystallites comprising:
a first oxide;
a second oxide dissolved into the first oxide having a dissolution degree to the first oxide of not less than 50%, and
a noble metal loaded on said support.

22. A catalyst according to claim 21, wherein a specific surface area of said particle is not less than 5 m$^2$/g.

23. A catalyst according to claim 21, wherein said crystallites have an average diameter of not more than 50 nm.

24. A solid solution particle of oxides according to claim 1, wherein the solid solution particle of oxides has an oxygen adsorption and discharge ability of up to about 800 $\mu$molO$_2$/g.

25. A solid solution particle of oxides according to claim 5, wherein the ratio Zr/(Ce+Zr) is about 0.5 and the solid solution particle of oxides has an oxygen adsorption and discharge ability of up to about 800 $\mu$molO$_2$/g.

26. A solid solution particle of oxides according to claim 7, wherein the solid solution particle of oxides has an oxygen adsorption and discharge ability of up to about 800 $\mu$molO$_2$/g.

27. A catalyst according to claim 18, wherein a ratio of the number of cerium atoms to the number of zirconium atoms in the solid solution particle of oxides, Zr/(Ce+Zr), is about 0.5, and the solid solution particle of oxides has an oxygen adsorption and discharge ability of up to about 800 $\mu$molO$_2$/g.

28. A catalyst according to claim 21, wherein the solid solution particle of oxides has an oxygen adsorption and discharge ability of up to about 800 $\mu$molO$_2$/g.

* * * * *